(12) United States Patent
Jones

(10) Patent No.: US 12,605,658 B2
(45) Date of Patent: Apr. 21, 2026

(54) FILTER FOR A TREATMENT APPARATUS

(71) Applicant: FRESH WORKS LTD, Bath (GB)

(72) Inventor: Gareth Jones, Bath (GB)

(73) Assignee: FRESH WORKS LTD, Bath (GB)

( * ) Notice: Subject to any disclaimer, the term of this patent is extended or adjusted under 35 U.S.C. 154(b) by 708 days.

(21) Appl. No.: 17/907,075

(22) PCT Filed: Mar. 23, 2021

(86) PCT No.: PCT/EP2021/057453
§ 371 (c)(1),
(2) Date: Sep. 22, 2022

(87) PCT Pub. No.: WO2021/191215
PCT Pub. Date: Sep. 30, 2021

(65) Prior Publication Data
US 2023/0347267 A1 Nov. 2, 2023

(30) Foreign Application Priority Data

Mar. 23, 2020 (GB) ...................................... 2004161

(51) Int. Cl.
B01D 33/06 (2006.01)
B01D 21/26 (2006.01)
(Continued)

(52) U.S. Cl.
CPC ........... B01D 33/06 (2013.01); B01D 21/262 (2013.01); B01D 33/722 (2013.01); B01D 33/76 (2013.01);
(Continued)

(58) Field of Classification Search
CPC ......... B01D 21/26; D06F 39/10; D06F 58/22; D06F 33/00; D06F 58/24
See application file for complete search history.

(56) References Cited

U.S. PATENT DOCUMENTS

2006/0196812 A1* 9/2006 Beetge ................... C10G 1/047
208/435
2009/0071912 A1* 3/2009 Mishina ............... B01D 33/275
210/791
(Continued)

FOREIGN PATENT DOCUMENTS

EP 1386575 A1 2/2004
EP 1386575 B1 * 10/2005 ......... A47L 15/4206
(Continued)

OTHER PUBLICATIONS

Application No. PCT/EP2021/057453, International Search Report mailed Oct. 5, 2021, 4 pages.
(Continued)

*Primary Examiner* — Benjamin L Lebron
*Assistant Examiner* — Marriah Ellington
(74) *Attorney, Agent, or Firm* — Kilpatrick Townsend & Stockton LLP

(57) ABSTRACT

A filter unit (10) for separation of particulate matter from particulate-laden liquid, the filter unit comprising: a chamber (12) defined by an upper axial end wall (14) and an opposing lower axial end wall (16) and a peripheral particle collection wall (18), the upper and lower axial end walls being spaced by the peripheral particle collection wall, the chamber being rotatable about an axis of rotation (30) so as to impart rotational motion to the liquid; an inlet (23) for delivering particulate-laden liquid into the chamber (12); an outlet (24) in the upper or lower axial end wall for discharging filtered liquid from the chamber; a flow path (22) from the inlet to the outlet; wherein the flow path includes a radial component from the inlet to the peripheral particle collection wall and an axial component along the peripheral particle collection wall.

11 Claims, 14 Drawing Sheets

(51) Int. Cl.

| | |
|---|---|
| *B01D 33/72* | (2006.01) |
| *B01D 33/76* | (2006.01) |
| *B04B 3/00* | (2006.01) |
| *B04B 11/06* | (2006.01) |
| *B04B 11/08* | (2006.01) |
| *D06F 39/10* | (2006.01) |

(52) U.S. Cl.
CPC ................ *B04B 3/00* (2013.01); *B04B 11/06* (2013.01); *B04B 11/08* (2013.01); *D06F 39/10* (2013.01)

(56) References Cited

U.S. PATENT DOCUMENTS

| | | | | |
|---|---|---|---|---|
| 2010/0216949 | A1* | 8/2010 | Friedrich | C08L 79/02 |
| | | | | 525/417 |
| 2013/0133250 | A1* | 5/2013 | Chan | A01K 63/045 |
| | | | | 494/52 |
| 2017/0137987 | A1* | 5/2017 | Xu | D06F 39/10 |
| 2019/0247864 | A1* | 8/2019 | Wu | B01D 17/0217 |
| 2020/0282345 | A1* | 9/2020 | Jibert | B01D 33/76 |

FOREIGN PATENT DOCUMENTS

| | | | | | |
|---|---|---|---|---|---|
| EP | 3124674 | A1 | 1/2017 | | |
| EP | 3128065 | A | 8/2017 | | |
| GB | 906303 | A | * | 9/1962 | |
| GB | 2216031 | A | 10/1989 | | |
| JP | 2007130380 | A | 5/2007 | | |
| JP | 2009006235 | A | 1/2009 | | |
| JP | 2018083054 | A | 5/2018 | | |
| KR | 20070021592 | A | 2/2007 | | |
| WO | 0176720 | A1 | 10/2001 | | |
| WO | 2006126478 | A1 | 11/2006 | | |
| WO | WO-2015049544 | A1 | * | 4/2015 | ............ D06F 23/02 |
| WO | 2018088321 | A1 | 5/2018 | | |
| WO | 2019049697 | A | 3/2019 | | |
| WO | 2019122862 | A | 6/2019 | | |
| WO | WO-2019122862 | A1 | * | 6/2019 | ......... A47L 15/4208 |
| WO | 2021191215 | A1 | 9/2021 | | |

OTHER PUBLICATIONS

Search Report issued in priority application GB2004161.2,, dated Sep. 2, 2020, 1 page.
Search Report issued in priority application GB2004161.2, dated Mar. 5, 2021, 1 page.

* cited by examiner

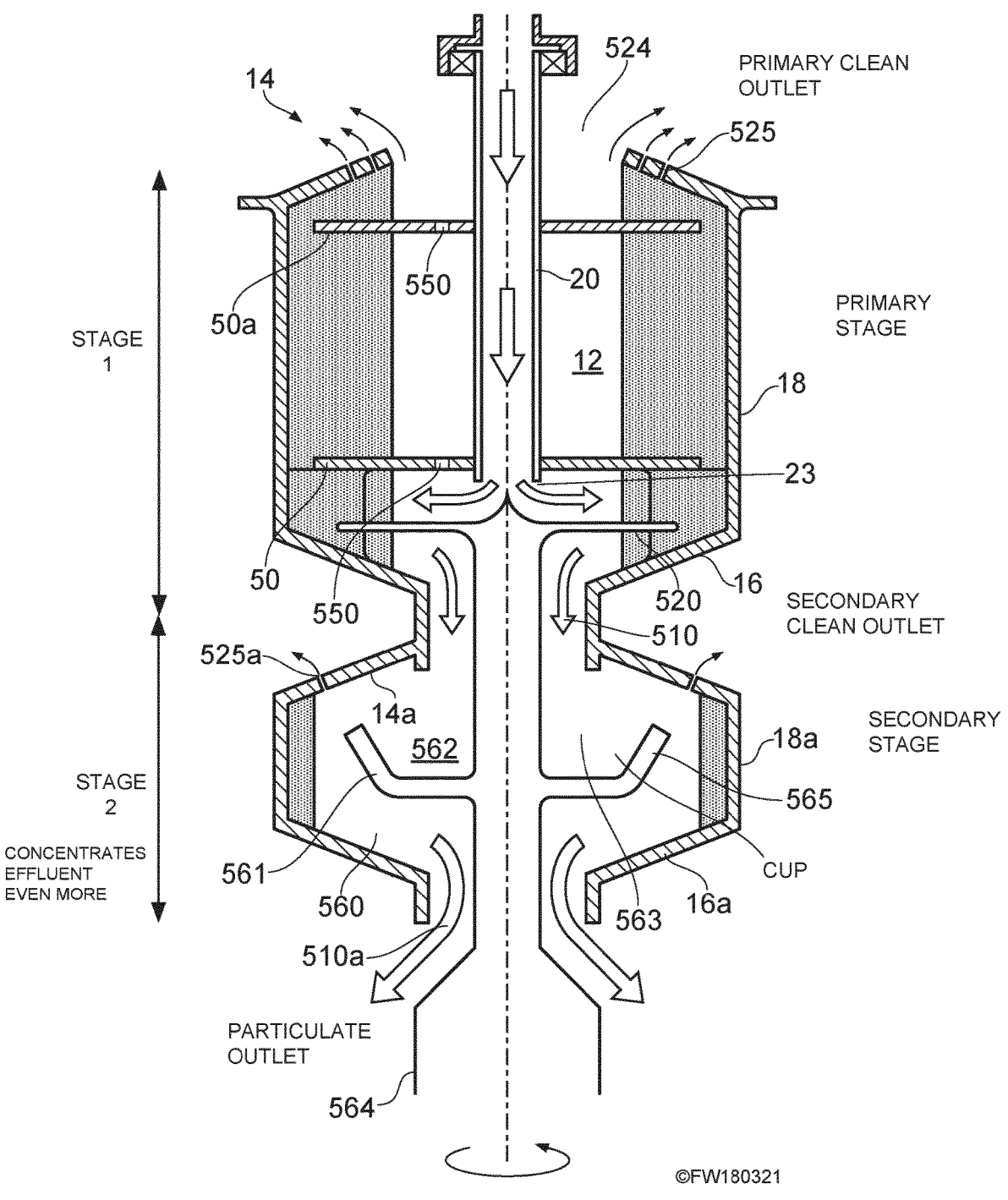
©FW180321
FIG. 23 MULTISTAGE FILTER

FILTER FOR A TREATMENT APPARATUS

CROSS REFERENCE TO RELATED APPLICATIONS

This application is a 371 National phase filing of PCT/EP2021/057453 filed Mar. 23, 2021, which application claims priority to Great Britain Patent Application No. 2004161.2, filed Mar. 23, 2020, the contents of which are hereby incorporated by reference in their entireties for all purposes.

The present disclosure relates to a filter unit for the separation of particulate matter from particulate-laden liquid and a washing apparatus including the filter unit. The present disclosure also relates to a method of filtering particulate matter from particulate-laden liquid.

BACKGROUND

Textile and fabric processing and washing appliances, both domestic and commercial, usually use water containing chemicals such as detergent to wash or condition the textile and fabric items. During the washing process, micro-fibres and micro-particles from the textile/fabric items being washed are often created. These micro-fibres and micro-particles enter the water and, at the end of the washing cycle, are ejected together with the dirty water, from the appliance.

There is a growing concern about the effect of these micro-fibers and micro-particles on our environment as they end up entering the water cycle and contaminating rivers and seas. It is estimated that a typical domestic washing machine can generate around 700,000 microscopic fibers for each wash. Clothing items may be composed of natural fibres such as cotton, synthetic fibres such as polyester and nylon, or a mix of a variety of fibres. Clothing items made of polycotton materials comprise both synthetic and natural fibres. Synthetic fibres tend to be larger mono filaments and so have a regular diameter, typically around 10 microns in diameter, and lengths of around 150 microns. Natural fibres such as cotton fibres consist of many smaller fibres spun together to form a thread. When cotton breaks down, the resulting fibres are much smaller than synthetic fibres with diameters of a few microns.

Because of their size, synthetic fibres are easily ingested by marine life, but because they are plastic, they are toxic. There is growing concern that these fibres are casing long term damage to the marine environment and in particular the food chain.

Washing appliances sometimes have a filter arrangement to filter impurities from the dirty washing liquid before it is ejected from the appliance. These filter appliances are not always effective at removing the micro-fibers produced during the washing process. Many filters for microfibres utilise some form of fine mesh, or permeable filter membrane, which is designed to let the liquid pass through but retain the particulate matter.

Furthermore, as fibres are filtered, the fibres tend to build up and form an impermeable layer on the filter medium. Even a relatively small layer of built up fibres can significantly reduce and sometimes prevent continued flow of water through the filter. This happens even when the filter includes a larger mesh size as, the more debris is collected, the more effective the filter becomes, which ultimately leads to blocking. This causes problems with flow rate during the washing cycle and makes it difficult to dewater the collected debris. It also means that the filter requires frequent emptying and cleaning in order to function effectively, which is not desirable in either domestic or commercial applications. Over time the pores in mesh filters can also become blocked by the build-up of deposits in the water, such as limescale, which impacts their performance and necessitates maintenance or replacement.

A further problem is that many new fabrics contain the residue of chemicals used in their manufacture, including for example lubricants that help with the weaving process. When these chemicals are washed out during the washing process, they combine with the fine fibres produced during the washing process and create an impermeable waxy sludge which compounds the problems above. This greatly reduces flow and further contributes to rapid blocking of the filter, necessitating regular emptying and cleaning.

There is a desire to develop a filter that can reduce the above problems.

SUMMARY

According to a first aspect, there is provided a filter unit for separation of particulate matter from particulate-laden liquid, the filter unit comprising:

a chamber defined by an upper axial end wall and an opposing lower axial end wall and a peripheral particle collection wall, the upper and lower axial end walls being spaced by the peripheral particle collection wall, the chamber being rotatable about an axis of rotation so as to impart rotational motion to the liquid;

an inlet for delivering particulate-laden liquid into the chamber;

an outlet in the upper or lower axial end wall for discharging filtered liquid from the chamber;

a flow path from the inlet to the outlet;

wherein the flow path includes a radial component from the inlet to the peripheral particle collection wall and an axial component along the peripheral particle collection wall.

By providing a filter unit with a flow path that includes a radial component from the inlet to the peripheral particle collection wall (hereinafter referred to as the collection wall) and an axial component along the collection wall, particulate-laden liquid can enter the rotating chamber and flow from the inlet towards the collection wall and subsequently along the collection wall before exiting the chamber via the outlet. As the particulate-laden liquid passes axially along the collection wall, particulate matter (e.g. fibres, microfibres, particles etc.) within the liquid is subjected to large centrifugal forces and is therefore deposited on the collection wall so that the liquid exiting the filter unit at the outlet is substantially free of particulate matter. Filtration can therefore be achieved without the use of any form of barrier filter (such as a mesh or perforated membrane/wall) which would ultimately block. The flow characteristics and separation (i.e. filtration) performance of the filter can therefore advantageously be constant regardless of the amount of particulate matter collected. By not requiring a mesh barrier, the filter unit can advantageously avoid becoming blocked as it filters.

Optional features will now be set out. These are applicable singly or in combination with any aspect.

The flow path axial component may be adjacent (e.g. directly adjacent) the collection wall. The flow path axial component may be parallel to the collection wall.

The radial component may be adjacent the upper axial end wall (hereinafter referred to as the upper end wall). The radial component may be adjacent the lower axial end wall (hereinafter referred to as the lower end wall).

The inlet and the outlet may be axially spaced. The inlet may be at (or proximal) the lower end wall and the outlet at (or proximal) the upper end wall. In these embodiments, the flow path will include an axially upwards component along the collection wall. As the chamber rotates, the liquid will include a circumferential component (around the axis of rotation), i.e. the liquid in the chamber rotates to create a vortex. The liquid vortex in the rotating chamber enables the liquid to travel upwards from the inlet to the outlet. In other embodiments, the inlet may be at (or proximal) the upper end wall and the outlet at (or proximal) the lower end wall, the flow path including an axially downwards component along the collection wall.

The axial spacing between the inlet and the outlet may be the axial length of the chamber (e.g. the inlet may be an aperture at the upper end wall and the outlet an aperture at the lower end wall or vice versa). In other embodiments, the axial spacing between the inlet and the outlet may be less than the full axial length of the chamber, for example the axial spacing may be less than 90%, less than 75%, less than 50%, less than 25%, less than 5% of the axial length of the chamber. Generally speaking the greater the axial spacing, the better the separation of fine particulate matter.

The filter unit may include a guide surface from the inlet to the collection wall.

The guide surface may be configured to guide the liquid radially from the inlet to the collection wall. The guide surface may extend radially from the inlet towards the collection wall (i.e. the guide surface may at least partly define the radial component of the flow path from the inlet to the collection wall).

The guide surface may be a solid (i.e. unperforated) surface. For example, in embodiments where the inlet is at (or proximal) the lower end wall, the guide surface may be an inside surface of the lower end wall. In embodiments where the inlet is at (or proximal) the upper end wall, the guide surface may be the inside surface of the upper end wall.

By including a solid guide surface between the inlet and the collection wall, the liquid introduced into the chamber is guided from the inlet to the collection wall.

The filter unit may include a guide plate between the lower end wall and the inlet. The guide plate may be a solid surface. The guide surface may be an upper surface of the guide plate.

The guide plate may be connected to the lower end wall e.g. supported by ribs. Thus the guide plate may be configured to rotate with the chamber (i.e. in the same direction and at the same rotational speed of the chamber).

The guide plate may be moveable axially upwards within the chamber so as to create additional space between the lower end wall and the guide plate. The guide plate may be moveable axially downwards.

The filter unit may include mechanical arms connecting the guide plate to the lower end wall. The mechanical arms may be configured to move the guide plate axially upwards and/or downwards within the chamber.

In some embodiments, the guide plate may be axially fixed relative to the chamber i.e. not axially moveable within the chamber. In these embodiment, the guide plate may not seal against the lower axial end wall.

As discussed above, the inlet may be at the upper end wall, e.g. the inlet may be an opening in the upper end wall. The inlet may be at the lower end wall, e.g. the inlet may be an opening in the lower end wall.

In other embodiments, the filter unit may include an inlet conduit extending within the chamber (e.g. from the upper axial end wall) and the inlet may be a conduit opening. The inlet/conduit opening may be an open end of the inlet conduit (i.e. an opening in the axial end of the inlet conduit). The inlet/conduit opening may be an opening in the side wall of the inlet conduit. The inlet conduit may include multiple openings in the side wall of the conduit.

The inlet/conduit opening may be towards the lower end wall, e.g. the axial spacing between the conduit opening and the lower end wall may be smaller than the axial spacing between the conduit opening and the upper end wall, such that, in use, liquid is delivered closer to the lower end wall than the upper end wall. For example, the inlet conduit may extend within the chamber from or through the upper axial end wall towards the lower axial end wall with a opening (e.g. a side or end opening) within the chamber proximal the lower axial end wall.

The axial spacing between the conduit opening and the upper end wall may be greater than 50%, greater than 60%, greater than 70%, greater than 80% or greater than 90% of the axial length of the chamber.

The inlet conduit may extend from an opening in the upper end wall. The inlet conduit may extend through the upper end wall (i.e. the inlet conduit may extend from above the upper end wall through the upper end wall and into the chamber).

The central longitudinal axis of the inlet conduit may be coaxial with the central longitudinal axis of the chamber. The central longitudinal axis of the inlet conduit may be coaxial with the axis of rotation of the chamber.

The inlet conduit may be fixed relative to the rotatable chamber. Alternatively, the inlet conduit may be rotatable about the axis of rotation of the chamber. The inlet conduit may be rotatable about the axis of rotation at the same speed as the chamber.

Alternatively, the inlet conduit may be rotatable about the axis of rotation at a different speed as the chamber. The inlet conduit may include a rotary seal for connecting the inlet conduit to the chamber (such that, in use, the inlet conduit rotates at a different speed to the chamber).

Feed to the inlet conduit may be under gravity, by a pressure pump, or by impeller within the filter chamber.

The inlet conduit may include an inlet radial flange. The inlet flange may be shaped substantially as a disc.

The inlet flange may extend radially from or proximal the axial end (e.g. the axial open end) of the inlet conduit.

The inlet flange (where present) at least partly defines the radial component of the flow path. For example, there may be a radial passage defined between the guide surface and the inlet flange.

In use, the inlet flange (and guide surface) diverts the delivered liquid radially outwards towards the collection wall of the chamber. The diverted liquid can then flow axially at a position nearer to the radially outer edge of the chamber where it will be subject to higher centrifugal forces (compared to liquid closer to the axis of rotation), therefore increasing the likelihood of particulate matter contained within the liquid being forced towards and against the collection wall. It will be appreciated that the centrifugal force increases in direct proportion to the radial spacing from the axis of rotation.

The inlet flange may be a lower flange extending proximal the lower end wall. In these embodiments, the radial flow path will extend between the upper (guide) surface of the lower end wall and the lower surface of the lower flange.

The inlet conduit may additionally or alternatively comprise an outlet flange extending radially from the inlet conduit proximal the outlet. The outlet flange may at least partly define a second radial component of the flow path e.g. from the collection wall to the outlet In use, the outlet flange diverts the liquid radially inwards from the collection wall towards the central axis of the chamber where it can exit via the outlet.

The outlet flange may be an upper flange extending proximal the upper end wall. In these embodiments, the second radial flow path will extend between the lower surface of the upper end wall and the upper surface of the upper flange. For example, there may be a radial passage defined between the upper flange and the upper end wall.

In some embodiments, including an outlet flange may prevent choking of the liquid when delivered to the chamber from an inlet towards the lower end wall. In some embodiments, the axial location of the outlet (upper) flange along the inlet conduit and the diameter of the outlet flange may be varied to control the flow rate through the filter.

In some embodiments, the filter unit may include an outlet (upper) flange and an inlet (lower) flange. Including both an outlet (upper) flange and an inlet (lower) flange can advantageously increase the filtration efficiency of the filter unit.

The outlet (e.g. upper) and/or inlet (e.g. lower) flange may each include a vent or bleed arrangement extending between opposing axial faces of the respective flange. The vent/bleed arrangement may be an aperture, e.g. a circular aperture, or a channel. It may include a valve. The/each vent/bleed arrangement in the outlet/inlet flange may be about 1.5 mm in width. The radial spacing between the vent/bleed arrangement in the outlet/inlet flange and the inlet conduit may be smaller than the radial spacing between the vent/bleed arrangement in the outlet/inlet flange and a radially outer edge of the outlet/inlet flange. In use, the vent/bleed arrangement may be configured to allow air to pass from one side of the flange to the other side of the flange in order to balance air pressure (and thus water levels). The vent/bleed arrangement also helps prevent the outlet/inlet flange from choking the flow of liquid in the chamber.

The outlet/inlet flange may be a continuous or discontinuous annulus.

The radial spacing between the radially outer edge of the outlet/inlet flange and the collection wall may be smaller than the radial spacing between the central longitudinal axis of the inlet conduit and the radially outer edge of the flange (i.e. the radially outer edge of the flange is closer to the collection wall than the central longitudinal axis of the inlet conduit). The distance from the axial centre of the inlet conduit to the radially outer edge of the outlet/inlet flange may be greater than 50%, greater than 60%, greater than 70%, greater than 80%, or greater than 90% of the radius of the chamber.

In other embodiments, the radial spacing between the radially outer edge of the outlet/inlet flange and the collection wall may be larger than the radial spacing between the central longitudinal axis of the inlet conduit and the radially outer edge of the flange (i.e. the radially outer edge of the flange is closer to the central longitudinal axis of the inlet conduit than the collection wall). The distance from the axial centre of the inlet conduit to the radially outer edge of the outlet/inlet flange may be 95% or less or 70% or less, such as 60% or less, e.g. 50% or less, or 40% or less, such as 30% or less, or 20% or less of the radius of the chamber. For example, the distance from the axial centre of the inlet conduit to the radially outer edge of the outlet/inlet flange may be between 20-95% or 30-95%, such as between 40-95% or 50 and 95%. These ranges mean that the inlet conduit/flange extend radially across between 20-95% or 30-95%, such as between 40-95% or 50 and 95% of the diameter of the chamber. In general, the larger the diameter of the flange, the greater the 'g' force that the water is subjected to as it flows past the flange and the greater the filtration efficiency.

The chamber may include a solid core configured to block out an area (e.g. a central area) of the chamber. The core may circumscribe the inlet conduit, i.e. the core may be generally annular. The solid core may extend radially (i.e. transversely) across greater than 50%, greater than 60%, greater than 70%, greater than 80%, or greater than 90% of the transverse width of the chamber.

The solid core may extend axially from the lower end wall to the upper end wall or from proximal the lower end wall to proximal the upper end wall (so as not to block the inlet and the outlet). In embodiments including the inlet (e.g. lower) flange, the solid core may extend axially from the inlet (e.g. lower) flange to proximal the distal (e.g. upper) end wall.

In use, the solid core diverts the rotating liquid towards the collection wall (i.e. towards the outer edge of the chamber), thus subjecting the liquid to the higher centrifugal forces. The solid core thus defines the axial flow path within the chamber and provides a narrower annular flow path towards the outer edge of the chamber.

The filter unit may include an inlet impeller (e.g. a rotatable impeller) at the inlet. For example the inlet impeller may be downstream of the inlet conduit, e.g. at the open end of the inlet conduit. The inlet impeller may be located between the inlet flange and the proximal (e.g. lower) end wall of the chamber.

The central axis of the inlet impeller may be coaxial with the central longitudinal axis of the chamber i.e. coaxial with the axis of rotation of the chamber.

The inlet impeller may be oriented such that the vanes of the inlet impeller extend transversely/radially across the chamber, i.e. the inlet impeller may be rotatable perpendicular to the central longitudinal axis of the chamber. The inlet impeller may be configured to increase the flow rate of the liquid entering the chamber. The inlet impeller may be configured to rotate the liquid at the same rotational speed as the chamber. The inlet impeller may be configured to suction liquid into the chamber.

The term 'transverse' is used to define a direction transverse to the longitudinal axis of rotation of the chamber e.g. in a radial direction for a chamber having a substantially circular cross-section perpendicular to the longitudinal axis.

The terms 'upstream' and 'downstream' are used with reference to the direction of travel of the liquid from inlet to outlet through the component during normal use of the component.

The outlet may include a circular opening e.g. a circular opening in the upper or lower end wall.

The outlet may be radially spaced from the axis of rotation of the chamber. The radial spacing from the axis of rotation to the outlet may be less than the radial spacing from the outlet to the collection wall.

The outlet may include a single opening or a series of openings e.g. arranged on the upper end wall. The series of openings may be symmetrically located either side of the central longitudinal axis of the chamber (i.e. diametrically opposed either side of the longitudinal axis). In other embodiments, the opening may be asymmetrically arranged either side of the central longitudinal axis. The openings may be arranged in a ring around (e.g. centred around) the central longitudinal axis of the chamber. The openings may be arranged in a ring with even circumferential spacing between the openings. The series of openings may be of varying sizes or increasing in size towards the axis of rotation. The openings may be about 1.5 mm in width or diameter.

The outlet may be an annular opening. The axial centre of the annular opening may be coincident with the central longitudinal axis of the chamber i.e. coincident with the axis of rotation.

The annular opening may surround/circumscribe the inlet conduit as the inlet conduit passes through the upper end wall.

In some embodiments, the outlet may include an annular opening (e.g. in the upper end wall) as well as an additional opening or multiple additional openings (e.g. in the upper end wall). The annular opening may be proximal to the inlet conduit and the additional opening may be radially distal from the inlet conduit.

The outlet may be fluidly connected to a drain. The outlet may be in the upper end wall. The outlet opening may taper outwardly (i.e. from the inside surface of the upper end wall to the outside surface of the upper end wall). In use, this may encourage the ejected liquid to move upwards and outwards as it exits the chamber.

The size and position of the outlet opening may be used to determine the liquid flow rate through the filter as the pressure in the rotating liquid within the filter varies as the square of the radial distance from the axis of rotation.

The filter unit may include a liquid quality sensor (such as a turbidity sensor) for monitoring the level of particulate matter in the liquid exiting the filter unit outlet. The liquid quality sensor may be located proximal the outlet.

The filter unit may include an outlet impeller (e.g. a rotatable impeller) at the outlet. For example the outlet impeller may be downstream of the outlet so as to direct liquid as it is expelled through the outlet.

The central axis of the outlet impeller may be coaxial with the central longitudinal axis of the chamber i.e. coaxial with the axis of rotation of the chamber.

The outlet impeller may be oriented such that the vanes of the impeller extend transversely/radially across the chamber, i.e. the outlet impeller may be rotatable perpendicular to the central longitudinal axis of the chamber. The outlet impeller may be configured to increase the flow rate of the liquid through the chamber and/or the flow rate of the liquid exiting the chamber.

The outlet impeller may be mounted on the outlet flange so as to be within the second radial component of the liquid flow path. For example, the outlet impeller may be mounted on an upper surface of the upper (outlet) flange, between the outlet flange and the upper end wall.

The filter unit includes a chamber for receiving particulate-laden liquid. The chamber may be cylindrical. The cylindrical chamber may have a diameter ranging from 120 mm to 180 mm. The cylindrical chamber may have a diameter of about 300 mm. The chamber may have an axial length of 80-100 mm.

The volume of the chamber may be between 1-30 litres. For example, the volume of the chamber may be between 20-30 litres. For example the volume of the chamber may be about 1 litre.

In some embodiments, the chamber may be polygonal or any other symmetrical shape about the axis of rotation i.e. its transverse cross-sectional profile (perpendicular to the axis of rotation) may be polygonal or otherwise symmetrical.

The collection wall may be tapered (e.g. the chamber may be generally frustoconical). For example, the collection wall may taper outwardly from the upper end wall to the lower end wall or from the lower end wall to the upper end wall.

The collection wall may include tapered portions (e.g. the chamber may include frustoconical portions). The collection wall may taper outwardly for a portion of the collection wall and inwardly for a portion (e.g. a remaining portion) of the collection wall such that the widest part of the chamber may be towards the top, the bottom or the middle (i.e. the middle of the axial length of the chamber) of the chamber.

The chamber including a tapered collection wall encourages particulate matter to collect and concentrate at the widest part of the chamber.

The angle of the tapered wall or the tapered portions may depend on the nature of the particulate matter being collected within the chamber. More viscous particulate matter may require the walls to taper at a more acute angle.

The collection wall may be solid (i.e. may contain no apertures). In some embodiments, the upper end or the lower end wall may be solid (i.e. unperforated) (other than the inlet/outlet).

The chamber may include at least one radially extending baffle. The at least one baffle may extend radially outward (e.g. from the inlet conduit) to proximal the collection wall. The baffle may extend radially inward from the collection wall towards the axial centre of the chamber (e.g. proximal the inlet conduit). The baffle may extend around at least a portion of the circumference or around the entire circumference of the inlet conduit and/or of the collection wall. The baffle is configured to divert the flow of liquid around the baffle as the liquid travels from the inlet to the outlet.

The chamber may include a plurality of radially extending baffles. The chamber may include a series of alternating outwardly extending baffles and inwardly extending baffles.

The baffles may be configured to increase the length of the flow path of the liquid as it travels from the inlet to the outlet. By increasing the length of the flow path of the liquid i.e. the distance that the liquid has to travel from the inlet to the outlet, the dwell time (i.e. the amount of time a given volume of rotating liquid remains within the rotating chamber before being expelled out of the chamber) may be increased. Increasing dwell time has been shown to increase filtration efficiency (i.e. the filter unit can filter particularly small particles).

The chamber may include one or more axially extending ribs. The rib(s) may extend axially along at least a portion of or the entire axial length of the chamber. For example, the rib(s) may extend axially along a quarter to a third of the axial length of the chamber. The rib(s) may extend greater than 20%, 30%, 40% or greater than 50% of the axial length of the chamber.

In use, the rib(s) may be configured to straighten the fluid flow (i.e. reduce turbulence) within the chamber as the liquid rotates towards the outlet.

In embodiments including an outlet/inlet flange and rib(s), the distance from the axial centre of the inlet conduit to the radially outer edge of the outlet/inlet flange may be less than 50%, less than 40%, less than 30%, or less than 20% of the radius of the chamber (so as to not interfere with the rib(s)).

The rib(s) may extend radially in from the collection wall to proximal the central longitudinal axis of the chamber. The rib(s) may be radially spaced from the axial centre of the chamber, i.e. the rib(s) do not extend to the axial centre of the chamber. An area downstream of the inlet may be free of rib(s) to enable the delivered liquid to enter the chamber. The inner upper corners of the rib(s) may be rounded. The rounded corners can advantageously promote smooth flow of liquid into the chamber and avoid long fibrous debris such as hair collecting on the ribs.

In embodiments including an inlet conduit, the ribs may extend radially inwards to proximal the inlet conduit. The ribs may be evenly radially distributed around the circumference of the chamber (i.e. the angular separation between the each rib in a transverse cross section of the chamber is equal).

The ribs may extend axially from the lower end wall. The ribs may be on the lower end wall (e.g. integral with the lower end wall or fixed to the lower end wall). Thus the ribs may be configured to rotate with the chamber (i.e. in the same direction and at the same rotational speed of the chamber).

In embodiments including a guide plate, the ribs may be on the guide plate (e.g. integral with or fixed to the guide plate). Thus the ribs may be configured to rotate with the guide plate.

In use, the rib(s) may be configured to rotate the liquid within the chamber. The rib(s) can advantageously force the liquid to rotate at the same rotational speed as the chamber. This is unlike an impeller which is designed to suck fluid into the impeller eye and eject the fluid radially outward, affecting flow rate (e.g. the inlet impeller configured to increase the flow rate of the liquid entering the chamber).

The rib(s) affect the rotational speed of the rotating liquid rather than the flow rate of the liquid entering the chamber. Without the rib(s), the liquid may not rotate at the same speed as the rotating chamber. Instead the liquid may rotate at a slower rotational speed than the rotating chamber, which can result in reduced filtration efficiency. Including the rib(s) can ensure that the liquid is rotating at the same rotational speed as the rotating chamber.

Including the rib(s) may increase filtration efficiency of the filter unit. They may also enable running the filter unit at higher flow rates (e.g. 15-20 litres/min) while still achieving high filtration efficiency.

The chamber may include at least one helical baffle extending radially around the inlet conduit or around the solid core, e.g. the baffle may be generally shaped as an internal Archimedean-style screw.

The vane(s) of the helical baffle may extend radially from the inlet conduit/solid core towards the collection wall thereby forcing the liquid to travel in a spiral around the inlet conduit.

Including a helical baffle may increase the flow path and dwell time of the liquid in the chamber.

The filter unit may include one or more vanes on the external surface of the chamber (e.g. on the external surface of the collection walls). The vanes may extend radially outward from the external face of the collection wall. The vanes may extend along at least a part of or the entire axial length of the chamber.

By including vanes on the external surface of the collection wall, the chamber may act as an impeller, i.e. the filter unit may be configured to act as a pump.

Multiple filter units including vanes on the exterior surface of the collection walls may be connected in series (i.e. the filter units are in fluid communication), such that the filter units may act as pumps to each other.

In some embodiments, the filter unit may include an outlet conduit with the outlet being an outlet conduit opening within the chamber for discharging liquid from the chamber. The outlet conduit may extend through the upper end wall into the chamber. The inlet may be an opening in the upper end wall. In these embodiments, the flow path may include a radial component from the inlet to the collection wall and an axially downward component along the collection wall from the upper end wall to the lower end wall. The liquid vortex causes the liquid to flow back up the outlet conduit opening.

The outlet conduit may include an axial conduit portion within the chamber. The outlet conduit may include a radial conduit portion outside the chamber. The outlet conduit may include a deflection portion (e.g. a curved conduit portion joining the axial conduit portion and the radial conduit portion). The deflection portion may extend through the upper end wall. In these embodiments, the discharged liquid may be ejected from the chamber in a radial direction. The outlet conduit may be a vortex finder.

In other embodiments, the outlet conduit may include a radial conduit portion within the chamber. The outlet conduit may include an axial conduit portion extending through the upper end wall. The deflection portion in these embodiments may be within the chamber. The outlet conduit may be substantially 'L' shaped.

The outlet conduit may be rotatable (e.g. axially rotatable) relative to the upper end wall so as to vary the radial spacing between the outlet (i.e. the conduit opening) and the central axis of the chamber.

The outlet conduit may be rotatable axially by 90 degrees.

The filter unit may include a housing for housing the chamber. The housing may be configured to collect the discharged filtered liquid and channel it to a drain. The housing may be configured to collect particulate matter ejected from the chamber (described further below). The housing may be a static housing (i.e. the housing may be non-rotatable with the chamber).

The filter unit may be configured such that the flow of particulate-laden material extends entirely within the filter chamber and does not flow through the housing (outside of the chamber).

The filter unit may include a motor for rotating the chamber about the axis of rotation. The motor may include a drive shaft extending from the motor to the chamber. The motor may be configured to rotate the chamber in a first direction and a second direction (i.e. reverse direction). Thus, the chamber may be rotatable in the first direction and/or the second direction.

The inlet conduit may be rotatable about the axis of rotation. The motor may be configured to rotate the inlet conduit. The inlet conduit may be rotatable in a first direction and/or the second direction. The motor may be configured to rotate the chamber and the inlet conduit in the same direction and the same rotational speed.

In some embodiments, the conduit may extend through (e.g. axially through) the chamber, i.e. the inlet conduit may extend axially through the upper end wall and axially through the lower end wall.

In some embodiments, the inlet conduit may form the drive shaft of the motor. The motor may be configured to rotate the chamber at a speed between 1000-10000 rpm, e.g. at around 10000 rpm for smaller domestic filter units e.g. at around 4000 rpm or e.g. at around 6000 rpm for larger filter units.

The outer surface of the inlet conduit may include a screw thread such that the inlet conduit may act as a lead screw and drive components mounted to the inlet conduit axially up and/or down the conduit (described further below).

The filter unit may include one or more bearing and seal units for reducing the mechanical stress on the rotating filter unit. The bearing and seal unit(s) may be around the inlet conduit, at a join between the inlet conduit and the upper end wall and/or around the drive shaft. The filter unit and motor drive may be mounted in a flexible bearing. These help absorb the vibrations created in the filter unit as the chamber rotates.

The filter unit may include an autobalancing unit for counteracting out of balance forces created by the rotating chamber. The autobalancing unit may include an automatic dynamic balancer.

In some embodiments, an inner surface of the chamber (e.g. the inner surface of the collection wall) may include ridges or grooves (e.g. the inner surface may be corrugated or may have a mesh layer). The ridges or grooves may be configured to capture, trap or concentrate the particulate matter collected against the collection wall and prevent it from being re-entrained into the rotating liquid.

The filter unit may be configured to be operated in one or more configurations. The above features may relate to the filter unit when operated in a use configuration where the chamber is rotatable about the axis of rotation such that, in use it collects particulate matter against the collection wall.

The filter unit may be configured to be operated in a dewatering configuration where any residual liquid that may remain in the chamber following operating the filter unit in the use configuration may be drained from the chamber.

The filter unit may be configured to be operated in a particle dispense configuration where the particulate matter collected in the chamber (e.g. on the collection wall) may be extracted or ejected from the chamber.

The filter unit may be configured to be operated sequentially through the configurations, for example the filter unit may be configured to be operated in the use configuration, then the dewatering configuration and finally in the particle dispense configuration. In other embodiments, the filter unit may be configured to be operated in only some or one configuration or it may be operated in one configuration multiple times before moving to the next configuration. For example the filter unit may be configured to be operated in the use configuration, the dewatering configuration, another use configuration and another dewatering configuration before moving to the particle dispense configuration.

The filter unit may stop rotating between each configuration. The filter unit may move immediately from one configuration to the next configuration without stopping rotating.

Once the available liquid has been filtered, liquid may no longer be introduced into the inlet. Any liquid remaining in the chamber may be ejected from the chamber via the outlet.

In embodiments where the outlet includes an annular opening and an additional opening in the upper end wall, the majority of the filtered liquid may exit the annular opening as the chamber rotates. Once the available liquid has been filtered, liquid may no longer by introduced into the inlet. Any liquid remaining in the chamber may be ejected from the additional opening in the upper end wall.

Once the remaining liquid has been ejected from the chamber the chamber may stop rotating.

In some cases, residual liquid that was not ejected from the chamber via the outlet during the use configuration may remain in the chamber. The filter unit may be operated in the dewatering configuration to drain the residual liquid from the chamber. Draining the residual liquid from the chamber may concentrate the particulate matter to a paste or may dry the layer of particulate matter to a solid.

The chamber may include a drain hole having an open configuration for allowing residual liquid left in the chamber after the use configuration to drain out of the chamber and a closed configuration.

The drain hole may be at the upper end wall, the lower end wall and/or the collection wall. The collection walls may be solid i.e. unperforated other than any drain hole(s).

The filter unit may include multiple drain holes, e.g. two drain holes in the collection wall and/or one on either side of the chamber.

The drain hole in the upper end wall may be radially spaced from the central longitudinal axis of the chamber. The radial spacing between the central longitudinal axis of the chamber and the drain hole may be larger than the radial spacing between the drain hole and the collection wall. The drain hole may be radially spaced from the collection wall. In use, the radial spacing between the drain hole in the upper end wall and the collection wall may define a dewatering liquid level. By providing a drain hole that is radially spaced from the collection wall, the chamber can advantageously be drained and still leave some residual liquid in the chamber such that the particulate matter may be concentrated to paste.

The drain hole may include a valve for moving the drain hole between the open configuration and the closed configuration. In the open configuration, the drain hole may be open to allow liquid to drain out of the chamber. The valve may be a centrifugal valve (i.e. a valve that is configured to open when the chamber rotates at a predetermined rotational speed and the centrifugal force is sufficiently high to open the centrifugal valve).

The filter unit may include a mesh lining on the inside face of the upper or lower end walls and/or collection wall. The mesh lining may be on the inside face of the wall including the drain hole. In use, the mesh lining can advantageously capture the particulate matter as the liquid drains from the drain hole. The mesh lining may be removable from the filter unit.

In embodiments including an L shaped outlet conduit (as described above), the L shaped conduit may have a use configuration and a dewatering configuration.

The outlet opening of the L shaped conduit in the use configuration may be radially inwards facing. The L shaped conduit may be axially rotatable (e.g. by 90 degrees) such that in the dewatering configuration, the outlet opening of the L shaped conduit may face along a tangential direction of the chamber.

The radial spacing between the outlet (i.e. the conduit opening within the chamber) and the collection wall when the L shaped conduit is in the use configuration may define a use liquid level. The radial spacing between the outlet and the collection wall when the L shaped conduit is in the dewatering configuration may define a dewatering liquid level. The radial spacing between the outlet and the collection wall when the L shaped conduit is in the use configuration may be larger than the radial spacing between the outlet and the collection wall when the L shaped conduit is the dewatering configuration. In use, this results in the use liquid level being larger than the dewatering liquid level.

The filter unit may include a mechanical linkage for rotating the L shaped outlet between the filtering configuration and the dewatering configuration. The mechanical linkage may be configured to rotate the L shaped outlet when the chamber is rotating and/or when the chamber is stationary. The chamber may include multiple L shaped conduits. The mechanical linkage may rotate the multiple L shaped conduits synchronously. The skilled person will know of a number of suitable mechanical linkages.

The filter unit may be configured to be operated in the particle dispense configuration (to extract/eject the particulate matter from the chamber). The filter unit may be operated in the particle dispense configuration immediately after being operated in the dewatering configuration. The filter unit may be configured to be operated in the particle dispense configuration every 20, 30 or 100 cycles of the filter unit being operated in the use configuration. In some embodiments (e.g. when filtering heavily particulate laden liquid), the filter unit may be configured to be operated in the use configuration, immediately followed by the dewatering configuration and the particle dispense configuration.

The chamber may include a particle dispense opening (e.g. an opening in the collection wall). The dispense opening may be towards the bottom of the collection wall (i.e. towards the lower end wall). The particle dispense opening may be selectively openable for dispensing particulate matter out of the chamber.

One of the radially extending baffles of the chamber may include a lateral wall extending around a portion of the circumference of the chamber. The lateral wall may include an opening which may be alignable with the particle dispense opening such that, in use, as the opening aligns with the particle dispense opening, particulate matter can be dispensed from the opening.

The lateral wall may extend from a vane of the helical baffle (or one of the helical baffles if multiple helical baffles are included), e.g. a lower portion of the vane of the helical baffle. During the filtering operation, the helical baffle rotates with the chamber so that the particle dispense opening remains closed during filtering. To remove collected particulate matter form the chamber after filtering, the helical baffle may be rotatable about the axis of rotation so as to align the lateral wall opening with the particle dispense opening. As described above, the helical baffle may be shaped as an Archimedean-style screw such that, in particle dispense use, rotation of the helical baffle may push particulate matter collected on the collection wall downwards towards the particle dispense opening.

In some embodiments, the particle dispense opening may be an opening in the lower end wall.

In embodiments including the guide plate, the guide plate may be moveable axially downwards towards the lower end wall (as described above) so as to close the dispense opening in the lower end wall. In other embodiments, the guide plate may be axially fixed relative to the chamber i.e. not axially moveable.

It may be mounted on a rotor or mount extending through the particle dispense opening e.g. through the particle dispense opening provided in the lower axial end wall. This may mean that the particle dispense opening is permanently open to/in fluid communication with the chamber during operation i.e. the guide plate does not seal against the lower axial end wall. Instead, it is mounted via the ribs which form channels to the particle dispense opening.

In some embodiments, with a guide plate e.g. a with a guide plate and a permanently open particle dispense opening, the inlet may comprise an inlet conduit as described above e.g. an inlet conduit with an opening proximal the lower axial end wall (and proximal the guide plate). The conduit may include an upper and or lower flange as described above e.g. an upper and/or lower flange each having a respective vent/bleed arrangement.

Where there is an axially fixed/static guide plate with an open particle dispense opening, the outlet may be an annular outlet as described above e.g. an annular outlet circumscribing the inlet conduit. In these embodiments, the diameter of the particle dispense opening (in the lower axial end wall) is preferably less than the diameter of the outlet (in the upper axial end wall).

In some embodiments, the chamber may be unitary. In other embodiments, the chamber may be formed of multiple casing components which join together to form the chamber. The casing components may join at one or more peripheral joints. The peripheral joint(s) may form a fluid tight seal.

The chamber may be formed of two casing components, i.e. an upper casing component and a lower casing component which may join at a peripheral joint. The upper casing component may include the upper end wall. The lower casing component may include the lower end wall. The upper and lower casing components may be casing halves. The upper casing component may be a lid and the lower casing component may be a base of the chamber.

The upper casing component and the lower casing component may be moveable between a closed position where the upper casing component and the lower casing component are joined at the peripheral joint forming a closed chamber and an open position where the upper casing component and the lower casing component are separated at the peripheral joint forming an annular opening at the peripheral joint. The particle dispense opening may be the annular opening between the upper casing component and the lower casing component when in the open position.

The collection walls of the upper and lower casing components may taper outwardly towards the peripheral joint between the casing components, such that the widest part of the chamber may be at the peripheral joint. This advantageously enables the particulate matter to concentrate at the peripheral joint so that it can be readily extracted from the annular opening as the upper and lower casing components move to the open position.

The upper and lower casing components may be biased towards the closed position (i.e. force is required to move the upper casing component and the lower casing component from the closed position to the open position). The upper casing component may be biased towards the closed position (i.e. the upper casing component may be biased towards the lower casing component), e.g. by means of a spring (e.g. a helical spring). The spring may be located axially above the upper casing component. The spring may circumscribe the inlet conduit.

In embodiments including moveable upper and lower casing components, the inlet conduit may form the drive shaft of the drive means and the outer surface of the inlet conduit may include a screw thread. The inlet conduit may be rotatable by the motor such that the inlet conduit may act as a lead screw.

The upper and lower casing components may be mounted to the inlet conduit. The upper and lower casing components may be transversely/radially constrained to the inlet conduit (e.g. the upper and lower casing components may each include an axial slot (or a bore) for receiving the inlet conduit). Thus, as the upper and lower casing components move between the closed position and the open position, the upper casing component and the lower casing component may remain axially aligned with the inlet conduit (and thus remain axially aligned with each other).

The inner surface of the axial slot/bore may include a screw thread which may connect to the screw thread on the inlet conduit, i.e. the upper and lower casing components may connect to the screw thread on the inlet conduit such that the casing components may be driveable axially along (i.e. up and down) the inlet conduit by rotation of the screw thread. In particular, the upper and lower casing component may be driveable axially along the inlet conduit between the closed and the open positions by rotation of the screw thread. By connecting the upper and lower casing components to the screw thread on the inlet conduit, the inlet conduit may act as a lead screw to the casing components, i.e. rotation of the inlet conduit may drive the upper and lower casing components axially along the inlet conduit between the open and closed positions. The skilled person will appreciate that rotational inertia of the inlet conduit will overcome the inherent friction between the upper and lower casing components.

In some embodiments, only the lower casing component may be connected to the screw thread on the inlet conduit. The upper casing component may be freely rotatable about the inlet conduit (e.g. the inner surface of the axial slot/bore on the upper casing component is smooth (or may be connected by a plain bearing) such that the upper casing component is not driveable by the screw thread on the inlet conduit). The upper casing component may be axially constrained to the inlet conduit (e.g. the axial slot/bore may be retainable in a groove in the wall of the inlet conduit, or the upper casing component may be connected to the inlet conduit by a shoulder and circlip) while the lower casing component may be axially driveable by the screw thread on the inlet conduit. In use, the inlet conduit may drive the lower casing component axially along the inlet conduit between the closed and open positions, while the upper casing component remains axially in position.

In other embodiments, the upper casing component may be connected to the screw thread on the inlet conduit and the lower casing component may be freely rotatable about the inlet conduit. The upper casing component may be axially driveable by the screw thread on the inlet conduit between the closed and open positions, while the lower casing components may be axially constrained to the inlet conduit.

In other embodiments, the filter unit may include a mechanical actuator to drive the upper and/or lower casing components between the closed position and the open position.

The filter unit may include a scraping plate (e.g. a scraping disc) mounted to the inlet conduit for scraping the collected particulate matter from the inside of the collection wall.

The plate may extend radially across the entire width of the chamber (i.e. the radially outer edge of the plate may contact the collection wall of the chamber).

The plate may be axially moveable along (i.e. up and down) the inlet conduit between a lower locking position and an upper engaging position. As the plate moves up and down the inlet conduit, the plate can advantageously scrape the collection wall, and thus scrape off the layer of particulate matter accumulated on the inside face of the collection wall. The radially outer edge of the scraping plate/disc may include an upwardly angled edge. The angled edge may be sharpened so as to aid with scraping against the collection wall. The angled edge may be flexible to accommodate slight variations in chamber width/diameter.

In embodiments including the scraping plate/disc, the inlet conduit may form the drive shaft of the motor and the outer surface of the inlet conduit may include a screw thread. As described above, the inlet conduit may be rotatable by the motor such that the inlet conduit may act as a lead screw.

The scraping plate may be rotationally coupled to the chamber (e.g. the scraping plate may include a peg, tab or pin slottable in a slot in the chamber) such that the scraping plate may rotate with the chamber.

The scraping plate/disc may be mounted to the inlet conduit. The plate/disc may be transversely/radially constrained to the inlet conduit e.g. the plate may include an axial slot or bore for receiving the inlet conduit. Thus as the scraping plate moves axially along the inlet conduit, the scraping plate may remain axially aligned with the inlet conduit. The inner surface of the axial slot may include a screw thread which may connect to the screw thread on the inlet conduit, i.e. the scraping plate may connect to the screw thread on the inlet conduit such that the scraping plate may be driveable axially along the inlet conduit by rotation of the screw thread. The inlet conduit may act as a lead screw to the scraping plate, i.e. rotation of the inlet conduit drive the scraping plate axially along the inlet conduit.

The scraping plate may be engageable with the upper casing component when in the upper engaging position such that, in use, movement of the scraping plate axially up the inlet conduit results in the scraping plate pushing against the upper casing component and moving the upper casing component from the closed position to the open position and movement of the plate axially down the inlet conduit and away from the upper casing component moves the upper casing component from the open position to the closed position.

In embodiments including the scraping plate, the upper and lower casing component (e.g. in the form of a lid and a base of the chamber) may be freely rotatable about the inlet conduit.

The scraping plate may be lockable to the lower casing component when in the lower locking position, e.g. the scraping plate may be configured to bottom out on the lower casing component. Rotation of the scraping plate when in the lower locking position may be configured to rotate the lower casing component.

According to a second aspect, there is provided a filter unit for separation of particulate matter from particulate-laden liquid, the filter unit comprising:

a chamber defined by an upper axial end wall and an opposing lower axial end wall and a peripheral particle collection wall, the upper and lower end walls being spaced by a peripheral particle collection wall, the chamber being rotatable about an axis of rotation so as to impart rotational motion to the liquid;

an inlet for delivering particulate-laden liquid into the chamber;

an outlet for discharging filtered liquid from the chamber;

wherein the chamber comprises a particle dispense opening for dispensing particulate matter from within the chamber.

The particle dispense opening may be as described above for the first aspect. Indeed, any features described above in relation to the first aspect are combinable with the second aspect.

The particle dispense opening may be selectively openable to dispense particulate matter out of the chamber.

The particle dispense opening may be an opening in the chamber collection wall.

The particle dispense opening may be an annular opening between an upper casing component and a lower casing component when in an open position.

In these embodiments, the chamber may be formed of multiple casing components which join together to form the chamber. The casing components may join at one or more peripheral joints. The peripheral joint(s) may form a fluid tight seal. The particle dispense opening may be provided at the peripheral joint i.e. the peripheral joint may be selectively openable to form an annular particle dispense opening.

The chamber may be formed of two casing components, i.e. an upper casing component and a lower casing component which may join at a peripheral joint. The upper casing component may include the upper end wall. The lower casing component may include the lower end wall. The upper and lower casing components may be casing halves. The upper casing component may be a lid and the lower casing component may be a base of the chamber.

The upper casing component and the lower casing component may be moveable between a closed position where the upper casing component and the lower casing component are joined at the peripheral joint forming a closed chamber and an open position where the upper casing component and the lower casing component are separated at the peripheral joint forming the annular particle dispense opening at the peripheral joint.

The upper and lower casing components may be biased towards the closed position (i.e. force is required to move the upper casing component and the lower casing component from the closed position to the open position). The upper casing component may be biased towards the closed position (i.e. the upper casing component may be biased towards the lower casing component), e.g. by means of a spring (e.g. a helical spring). The spring may be located axially above the upper casing component. The spring may circumscribe the inlet conduit.

In embodiments including moveable upper and lower casing components, the inlet conduit may form the drive shaft of the drive means and the outer surface of the inlet conduit may include a screw thread. The inlet conduit may be rotatable by the motor such that the inlet conduit may act as a lead screw.

The upper and lower casing components may be mounted to the inlet conduit. The upper and lower casing components may be transversely/radially constrained to the inlet conduit (e.g. the upper and lower casing components may each include an axial slot (or a bore) for receiving the inlet conduit). Thus, as the upper and lower casing components move between the closed position and the open position (where the annular particle dispense opening is formed), the upper casing component and the lower casing component may remain axially aligned with the inlet conduit (and thus remain axially aligned with each other).

The inner surface of the axial slot/bore may include a screw thread which may connect to the screw thread on the inlet conduit, i.e. the upper and lower casing components may connect to the screw thread on the inlet conduit such that the casing components may be driveable axially along (i.e. up and down) the inlet conduit by rotation of the screw thread. In particular, the upper and lower casing component may be driveable axially along the inlet conduit between the closed and the open positions by rotation of the screw thread. By connecting the upper and lower casing components to the screw thread on the inlet conduit, the inlet conduit may act as a lead screw to the casing components, i.e. rotation of the inlet conduit may drive the upper and lower casing components axially along the inlet conduit between the open and closed positions. The skilled person will appreciate that rotational inertia of the inlet conduit will overcome the inherent friction between the upper and lower casing components.

In some embodiments, only the lower casing component may be connected to the screw thread on the inlet conduit. The upper casing component may be freely rotatable about the inlet conduit (e.g. the inner surface of the axial slot/bore on the upper casing component is smooth (or may be connected by a plain bearing) such that the upper casing component is not driveable by the screw thread on the inlet conduit). The upper casing component may be axially constrained to the inlet conduit (e.g. the axial slot/bore may be retainable in a groove in the wall of the inlet conduit, or the upper casing component may be connected to the inlet conduit by a shoulder and circlip) while the lower casing component may be axially driveable by the screw thread on the inlet conduit. In use, the inlet conduit may drive the lower casing component axially along the inlet conduit between the closed and open positions, while the upper casing component remains axially in position.

In other embodiments, the upper casing component may be connected to the screw thread on the inlet conduit and the lower casing component may be freely rotatable about the inlet conduit. The upper casing component may be axially driveable by the screw thread on the inlet conduit between the closed and open positions, while the lower casing components may be axially constrained to the inlet conduit.

In other embodiments, the filter unit may include a mechanical actuator to drive the upper and/or lower casing components between the closed position and the open position.

The filter unit may include a scraping plate (e.g. a scraping disc) mounted to the inlet conduit for scraping the collected particulate matter from the inside of the collection wall.

The plate may extend radially across the entire width of the chamber (i.e. the radially outer edge of the plate may contact the collection wall of the chamber).

The plate may be axially moveable along (i.e. up and down) the inlet conduit between a lower locking position and an upper engaging position. As the plate moves up and down the inlet conduit, the plate can advantageously scrape the collection wall, and thus scrape off the layer of particulate matter accumulated on the inside face of the collection wall. The radially outer edge of the scraping plate/disc may include an upwardly angled edge. The angled edge may be sharpened so as to aid with scraping against the collection wall. The angled edge may be flexible to accommodate slight variations in chamber width/diameter.

In embodiments including the scraping plate/disc, the inlet conduit may form the drive shaft of the motor and the outer surface of the inlet conduit may include a screw thread. As described above, the inlet conduit may be rotatable by the motor such that the inlet conduit may act as a lead screw.

The scraping plate may be rotationally coupled to the chamber (e.g. the scraping plate may include a peg slottable in a slot in the chamber) such that the scraping plate may rotate with the chamber.

The scraping plate/disc may be mounted to the inlet conduit. The plate/disc may be transversely/radially constrained to the inlet conduit e.g. the plate may include an axial slot or bore for receiving the inlet conduit. Thus as the scraping plate moves axially along the inlet conduit, the scraping plate may remain axially aligned with the inlet conduit. The inner surface of the axial slot may include a screw thread which may connect to the screw thread on the inlet conduit, i.e. the scraping plate may connect to the screw thread on the inlet conduit such that the scraping plate may be driveable axially along the inlet conduit by rotation of the screw thread. The inlet conduit may act as a lead screw to the scraping plate, i.e. rotation of the inlet conduit drive the scraping plate axially along the inlet conduit.

The scraping plate may be engageable with the upper casing component when in the upper engaging position such that, in use, movement of the scraping plate axially up the inlet conduit results in the scraping plate pushing against the upper casing component and moving the upper casing component from the closed position to the open position (where the particle dispensing opening is formed) and movement of the plate axially down the inlet conduit and away from the upper casing component moves the upper casing component from the open position to the closed position.

In embodiments including the scraping plate, the upper and lower casing component (e.g. in the form of a lid and a base of the chamber) may be freely rotatable about the inlet conduit.

The scraping plate may be lockable to the lower casing component when in the lower locking position, e.g. the scraping plate may be configured to bottom out on the lower casing component. Rotation of the scraping plate when in the lower locking position may be configured to rotate the lower casing component.

The collection walls of the upper and lower casing components may taper outwardly towards the peripheral joint between the casing components, such that the widest part of the chamber may be at the peripheral joint. This advantageously enables the particulate matter to concentrate at the peripheral joint so that it can be readily extracted from the annular opening as the upper and lower casing components move to the open position.

The collection wall may include tapered portions (e.g. the chamber may include frustoconical portions). For example, the upper casing may taper outwardly (from the upper wall to the peripheral joint) and the lower casing may taper inwardly (from the peripheral joint to the lower wall) such that the widest part of the chamber (and the particle dispense opening) may be towards. the middle of the axial length of the chamber.

The dispense opening may be towards the bottom of the collection wall (i.e. towards the lower end wall).

In these embodiments, the chamber may include at least one helical baffle extending helically around an inlet conduit (the inlet conduit being as described above for the first aspect) e.g. the baffle may be generally shaped as an internal Archimedean-style screw. The vane(s) of the helical baffle(s) may extend radially from the inlet conduit towards the collection wall thereby forcing the liquid to travel in a spiral around the inlet conduit. The helical baffle may be rotatable with the chamber e.g. with the inlet conduit during filtration.

One of the helical baffles of the chamber may include a lateral wall extending around a portion of the circumference of the chamber. The lateral wall may include an opening which may be alignable with the particle dispense opening such that, in particle dispense use (after filtration), as the opening aligns with the particle dispense opening, particulate matter can be dispensed from the opening.

The lateral wall may extend from a vane of the helical baffle (or one of the helical baffles if multiple helical baffles are included), e.g. a lower portion of the vane of the helical baffle. The helical baffle may be rotatable about the axis of rotation so as to align the lateral wall opening with the particle dispense opening after filtration. As described above, the helical baffle may be shaped as an Archimedean-style screw such that, in use, rotation of the helical baffle may push particulate matter collected on the collection wall downwards towards the particle dispense opening.

The particle dispense opening may be an opening in the lower end wall.

In these embodiments, the filter unit may include a guide plate as described above for the first aspect between the lower axial end wall and the inlet. The guide plate may be connected to/mounted on the lower end wall e.g. by ribs. The guide plate may be moveable axially upwards within the chamber so as to create additional space between the lower end axial wall and the guide plate. In moving upwards, the particle dispense opening exposed to allow removal (e.g. by gravity) of debris form the collection walls. The guide plate may be moveable axially downwards to close the particle dispense opening. The filter unit may include mechanical arms connecting the guide plate to the lower end wall. The mechanical arms may be configured to move the guide plate axially upwards and/or downwards within the chamber. The guide plate may be provided with axially-extending ribs as described above for the first aspect.

In other embodiments, the guide plate may be axially fixed relative to the chamber i.e. not axially moveable. It may be mounted on a rotor or mount extending through the particle dispense opening e.g. through the particle dispense opening provided in the lower axial end wall. This may mean that the particle dispense opening is in fluid communication with the chamber during operation i.e. the guide plate does not seal against the lower axial end wall. Instead, the axially fixed guide plate rests on the ribs with channels formed therebetween providing access to the particle dispense opening.

In embodiments with a guide plate e.g. with a guide plate and an open/exposed particle dispense opening, the inlet may comprise an inlet conduit as described above e.g. an inlet conduit with an opening proximal the lower axial end wall (and proximal the guide plate). The conduit may include an upper and or lower flange as described above e.g. an upper and/or lower flange each having a respective vent/bleed arrangement.

Where the particle dispense opening is in the lower axial end wall, the filter unit may further comprise a secondary (lower) chamber in fluid communication with the particle dispense opening. The secondary chamber may be integrally formed with the (primary) chamber.

The secondary chamber may have an upper axial end wall with an opening in fluid communication with the particle dispense opening. The upper axial end wall of the secondary chamber may have a secondary outlet e.g. a series of outlet apertures arranged in a ring on the upper axial end wall of the secondary chamber. The secondary outlet aperture(s) may be radially outwards of the outlet(s) in the upper axial end wall of the (primary) chamber. The secondary chamber may have a lower axial end wall with a second (lower) particle dispense opening. It may have peripheral collection walls extending between the upper and lower axial end walls of the second chamber.

A collection cup having a receiving recess with a collection opening facing the particle dispense opening (of the (primary) chamber) may be provided in the second (lower) chamber. The collection cup may be mounted on an axial mount/rotor e.g. on the axial mount/rotor upon which the guide plate in the (primary) chamber) is mounted. The collection cup has tapered walls such that the collection opening is wider than the base of the collection cup.

In use, paste or concentrated liquid containing particulate matter is ejected (under gravity) from the particle dispense opening of the (primary) chamber into the secondary chamber where it is collected in the collection cup.

Upon recommencement of rotation of the filter unit, the concentrated liquid/paste moves up the tapered walls from the base of the collection cup under centrifugal force and is flung from the cup onto the peripheral walls of the secondary chamber. Any liquid within the concentrate/paste is ejected from the outlet(s) in the upper axial end wall so that the concentrate/paste is further concentrated. The particulate matter collected on the peripheral walls of the secondary chamber is expelled form the filter unit under gravity through the lower particle dispense opening once rotation ceases.

For any embodiments of the second aspect, the inlet and/or outlet may be as described above for the first aspect. For example, the inlet may be provided by an inlet conduit as described above e.g. an inlet conduit extending from or through the upper axial end wall with an axial and/or side opening proximal the lower end wall.

The inlet conduit may include an outlet (e.g. upper) flange as described above for the first aspect.

The or each flange may include a respective vent/bleed arrangement as described above.

The outlet may include a circular opening e.g. a circular opening in the end wall. The outlet may comprise an annular opening circumscribing the inlet conduit and may be radially spaced from the inlet conduit or may extend to the inlet conduit.

In some embodiments, the outlet may include an annular opening (e.g. in the upper end wall) as well as an additional opening or multiple additional openings (e.g. in the upper end wall). The annular opening may be proximal to the inlet conduit and the additional opening may be radially distal from the inlet conduit.

In embodiments where there is guide plate e.g. an axially static guide plate and an exposed dispense opening, the diameter of the particle dispense opening (in the lower axial end wall) may be less than the diameter of the annular outlet (in the upper axial end wall).

The filter unit of the second aspect may be configured to be operated in the particle dispense configuration (to extract/eject the particulate matter from the chamber). The filter unit may be operated in the particle dispense configuration immediately after being operated in the dewatering configuration (described above for the first aspect). The filter unit may be configured to be operated in the particle dispense configuration every 20, 30 or 100 cycles of the filter unit being operated in the use configuration. In some embodiments (e.g. when filtering heavily particulate laden liquid), the filter unit may be configured to be operated in the use configuration, immediately followed by the dewatering configuration and the particle dispense configuration.

According to a third aspect, there is provided a washing apparatus for washing textile items, the apparatus comprising:

a housing in which a drum is rotatably mounted, the drum including side walls comprising one or more apertures configured to discharge liquid from the drum;

a collector located downstream of the drum and configured to collect liquid discharged from the drum;

a filter unit according to the first or second aspect; and a flow pathway between the collector and the inlet of the filter unit.

The outlet of the filter unit may be fluidly connected to the drum. For example, the outlet of the filter unit may be selectively fluidly connectable to the drum so as to be fluidly connected to the drum during a washing process. The outlet filter unit may be selectively fluidly connectable to a drain during a dewatering process.

The apparatus may be a washing machine. The filter unit can be used to clean water during the wash water during the wash cycle to improve wash performance.

According to a fourth aspect, there is provided a method of filtering particulate matter from particulate-laden liquid in a washing apparatus, including the filter unit according to the first or second aspect, the method comprising:

introducing particulate-laden liquid into the chamber via the inlet; and rotating the chamber about the axis of rotation at a first speed configured to move the liquid in a radial direction from the inlet to the peripheral particle collection wall and axially along the peripheral particle collection wall.

Rotating the chamber about the axis of rotation may include operating the motor to rotate the chamber.

The method may include rotating the chamber at a first speed configured to generate centrifugal forces in the rotating liquid that are orders of magnitude greater than the gravitational forces acting on the liquid.

The centrifugal forces being orders of magnitude greater than gravitational forces, it will be apparent to the skilled person that the filter unit may work effectively as described in any orientation, i.e. upside down, horizontally or any point in between.

The rotational speed may be chosen such that the centrifugal force is sufficient to capture a desired percentage of particulate matter against the peripheral particle collection wall (i.e. the collection wall) without the use of any form of barrier filter (e.g. a mesh).

The first speed may be between 1000-10000 rpm, e.g. at around 10000 rpm for smaller domestic filter units, e.g. at around 4000 rpm or e.g. at around 6000 rpm for larger filter units.

The method may include rotating the chamber such that the centrifugal force generated in the liquid is 15000 ms$^{-2}$ or about 1500 G.

The method may include providing an inlet conduit as described above for the first and second aspect, rotating the inlet conduit about the axis of rotation in the same direction and/or at the same rotational speed as the chamber.

The method may include providing an outlet as described above for the first aspect and rotating the chamber at the first speed such that particulate matter in the liquid may be collected against the collection wall and filtered liquid may exit the outlet.

The filter unit may have a dwell time (i.e. the amount of time a given volume of rotating liquid remains within the rotating chamber before being expelled out of the chamber) of 1 to 120 seconds.

For example, the filter unit may have a dwell time of 6 seconds, e.g. the filter unit may have a chamber capacity of 1 litre and a flow rate of 10 litres/min. For example, the filter unit may have a dwell time of 120 seconds, e.g. the filter unit may have a chamber capacity of 1 litre and a flow rate of 0.5 litre/min.

The filter unit may have a flow rate of between 0.5 litres/min to 20 litres/min. For example, the filter unit may have a flow rate of about 10 litres/min. In some embodiments, the filter unit may have a flow rate of 15-20 litres/min. Embodiments with significantly higher flow rates are also envisioned.

The dwell time may also be increased by increasing the volume of the filter chamber. Increasing dwell time has been shown to increase filtration efficiency i.e. the filter unit can filter particularly small particles, and capture a larger percentage of particulate matter in the feed liquid.

The separation efficiency of the filter may be varied during use by varying the flow rate through the filter. Flow rate may be varied by throttling the inlet to the chamber, or by changing the size of the outlet opening(s) in the chamber and/or the position of the outlet opening(s) relative to the axis of rotation. The liquid quality sensor may monitor the cleanliness of the liquid exiting the filter at the outlet and the flow rate adjusted to maintain a constant filtration efficiency.

The above features may relate to the filter unit being operated in the use configuration. Once all the available liquid has been filtered, liquid may no longer be introduced into the inlet.

Any liquid remaining in the chamber may be ejected from the chamber via the outlet.

The method may include providing an outlet including an annular opening in the upper end wall and an additional opening in the upper end wall as described above for the first aspect and rotating the chamber at the first speed such that filtered liquid may exit the annular opening. Once all the available liquid has been filtered, liquid may no longer be introduced into the inlet. Any remaining liquid in the chamber may be ejected from the chamber via the additional opening.

Once the remaining liquid has been ejected from the chamber, the chamber may stop rotating. As the chamber stops rotating, particulate matter collected on the collection wall may be allowed to fall (under gravity) toward the lower end wall. The method may include providing a particle dispense opening in the lower end wall as described above for the first aspect such that, as the chamber stops rotating, the particulate matter may fall out of the particle dispense opening.

As described above, in some cases not all the liquid is ejected from the chamber. Residual liquid not ejected from the chamber when operating the filter unit in the use configuration may remain in the chamber.

The method may include operating the filter unit in the dewatering configuration to drain the residual liquid from the chamber. Dewatering the chamber of residual liquid may concentrate the particulate matter (i.e. reduce the water content of the particulate matter) accumulated on the collection wall to a paste/concentrated liquid or dry the particulate matter to a solid which may be easier to handle and therefore facilitate removal of the particulate matter from the chamber.

The method may include providing drain valve(s) as described above for the first and second aspects and rotating the chamber at the second speed to open the drain valve(s) (e.g. the centrifugal valve(s)) in the drain hole(s). The method may include opening the drain valve(s) to drain the chamber of residual liquid.

The method may include providing drain valve(s) in the upper end wall, opening the drain valve(s) and rotating the chamber to drain the chamber of residual liquid to the dewatering liquid level.

The method may include providing L shaped outlet conduits in the use configuration as described above for the first aspect and rotating the chamber to collect the particulate matter at the collection wall. The method may include rotating the L shaped outlet conduits from the use configuration to the dewatering configuration and rotating the chamber to drain the residual liquid in the chamber to the dewatering liquid level. The method may include providing the mechanical linkage as described above for the first aspect and operating the mechanical linkage to rotate the L shaped outlet conduits from the use configuration not the dewatering configuration.

The method may include providing an inlet conduit as described above for the first and second aspects and rotating the inlet conduit in a first direction (e.g. clockwise). The method may include rotating the inlet conduit in the first direction to rotate the chamber in the first direction due to the inherent friction between the inlet conduit and the chamber.

The method may include providing upper and lower casing components as described above for the first and second aspects and rotating the inlet conduit in the first direction when the upper and lower casing component are in the closed position. The method may include rotating the inlet conduit and the lower casing component in the first direction. The method may include rotating the lower casing component to rotate the upper casing component in the same direction and the same rotational speed as the lower casing component due to inherent friction between the upper and lower casing components.

The method may include rotating the inlet conduit in the second direction (e.g. anti-clockwise). The method may include providing a screw thread on the inlet conduit and rotating the inlet conduit in the second direction to rotate the screw thread on the inlet conduit in the second direction. The method may include rotating the screw thread in the second direction to drive the lower casing component from the closed position to the open position, thereby providing an annular opening between the upper and lower casing components. In embodiments of the first/second aspect where the upper casing component is axially fixed to the inlet conduit, the method may include rotating the inlet conduit in the second direction to rotate the screw thread in the second direction and drive the lower casing component axially down the inlet conduit from the closed position to the open position, (and maintaining the upper casing component axially in position).

The method may include rotating the chamber when the upper and lower casing components are in the open position, thereby ejecting the collected particulate matter radially outward from the annular opening between the upper and lower casing components. The ejected particulate matter may be ejected from the annular opening along a lower transverse plane.

The method may include rotating the inlet conduit in the first direction when the upper and lower casing components are in the open position. The method may include rotating the inlet conduit in the first direction to rotate the screw thread in the first direction and drive the lower casing component up the inlet conduit from the open position to the closed position, thereby closing the annular opening between the upper and lower casing components.

In embodiments where both the upper and lower casing components are connected to the screw thread on the inlet conduit, the method may include rotating the screw thread in the second direction to drive both the upper and the lower casing components from the closed position to the open position. The method may include rotating the screw thread in the first direction to drive both the upper and the lower casing component from the open to the closed position.

The method may include providing a scraping plate as described above for the first aspect and rotating the inlet conduit in the first direction when the scraping plate is in the lower locking position and the upper and lower casing component are in the closed position. The method may include rotating the scraping plate in the first direction to rotate the lower casing component in the first direction (due to the scraping plate being locked or bottomed out to the lower casing component).

The method may include rotating the inlet conduit in the second direction to rotate the screw thread in the second direction and unlock the scraping plate from the lower locking position and thus unlock the scraping plate from the lower casing component. The method may include rotating the screw thread in the second direction to drive the scraping plate axially up the inlet conduit from the lower locking position to the upper engaging position. The method may include rotating the inlet conduit in the second direction and driving the scraping plate against the upper casing component. The method may include rotating the inlet conduit in the second direction to drive the scraping plate against the upper casing component and move the upper casing component from the closed position to the open position.

Driving the scraping plate up against the upper casing component may apply sufficient upward force against the upper casing component to overcome the bias of the spring pushing the upper casing component towards the closed position. The method may include rotating the chamber when the upper casing component is in the open position, thereby ejecting the particulate matter radially outwards from the annular opening between the upper and the lower casing components.

The method may include rotating the inlet conduit in the first direction to rotate the screw thread in the first direction.

The method may include rotating the screw thread in the first direction when the scraping plate is in the upper engaging position to drive the scraping plate axially down the inlet conduit.

The method may include rotating the screw thread in the first direction to drive the scraping plate down the inlet conduit and move the upper casing component from the open position to the closed position. The spring biasing the upper casing component towards the closed position may ensure that the upper casing component moves from the open position to the closed position when the scraping plate is driven down the inlet conduit. The method may include rotating the screw thread in the first direction to drive the scraping plate axially down the inlet conduit to the lower locking position and locking the scraping plate to the lower casing component.

The method may include providing a helical baffle and rotating the helical baffle relative to the chamber. The method may include rotating the helical baffle relative to the chamber by rotating the helical baffle by 30-60 rpm faster or slower than the rotating chamber.

The method may include rotating the helical baffle relative to the chamber and aligning the lateral wall opening with the particle dispense opening so as to open the dispense opening. The method may include rotating the chamber when the lateral wall opening is aligned with the particle dispense opening such that particulate matter is ejected radially outward from the dispense opening. The method may include rotating the helical baffle relative to the chamber such that the lateral wall opening aligns with the particle dispense opening once per revolution of the helical baffle.

The method may include rotating the helical baffle relative to the chamber and mis-aligning the lateral wall opening with the particle dispense opening so as to close the dispense opening.

While the above description is in relation to a filter unit for filtering particulate matter from a liquid, it will be readily apparent that the same techniques can be applied to filter particulate matter from a gas or a fine suspension of liquid particles in a gas.

The disclosure includes the combination of the aspects and preferred features described except where such a combination is clearly impermissible or expressly avoided.

SUMMARY OF THE FIGURES

Embodiments will now be discussed with reference to the accompanying figures in which:

FIG. 23 is a cross section view of a modified filter unit of FIG. 22.

DETAILED DESCRIPTION

Aspects and embodiments will now be discussed with reference to the accompanying figures. Further aspects and embodiments will be apparent to those skilled in the art.

Figures 1, 2:
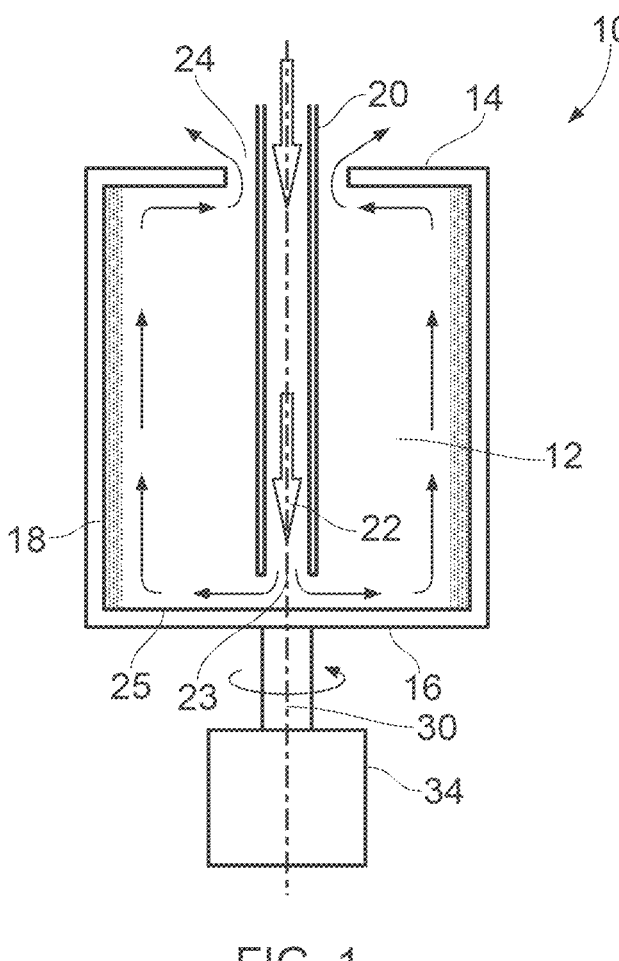
FIG. 1 is a schematic drawing of a filter unit according to a first embodiment.
FIG. 2 is a cross-sectional view of a filter unit according to a second embodiment.

FIG. 1 shows a schematic drawing of a filter unit 10 according to a first embodiment. The filter unit 10 includes a cylindrical chamber 12 defined by an upper axial end wall (upper end wall) 14, an opposing lower axial end wall (lower end wall) 16 and a peripheral particle collection wall (collection wall) 18. The upper and lower end walls are spaced by and connected by the collection wall 18. The filter unit 10 includes an inlet opening 23 for delivering particulate-laden liquid into the chamber 12. In particular, the inlet includes a conduit 20 which extends axially through the upper end wall 14 and into the chamber 12. The inlet opening 23 is an axial open end of the conduit 20.

The inlet opening 23 is towards the lower end wall 16. The inlet conduit 20 includes a length that is greater than 80% of the axial length of the chamber 12 such that the axial spacing between the inlet opening 23 and the lower end wall 16 is smaller than the axial spacing between the inlet opening 23 and the upper end wall 14.

The filter unit 10 includes an outlet 24 at the upper end wall 14 for discharging filtered liquid from the chamber 12. In this embodiment, the outlet 24 is an annular opening which circumscribes the inlet conduit 20.

The chamber 12 is rotatable about an axis of rotation 30 which in this embodiment is the central longitudinal axis of the chamber 12. The central longitudinal axis of the inlet conduit 20 and the axial centre of the annular outlet 24 are coaxial with the axis of rotation 30. The filter unit 10 includes a motor 34 for rotating the chamber 12 about the axis of rotation 30.

The flow path of the liquid from the inlet 23 to the outlet 24, as indicated by the arrows 22, includes a radial component from the inlet 23 to the collection wall 18 and an axially upwards component along the collection wall 18. The inlet 23 being towards the lower end wall 16 results in the radial component of the flow path being directly adjacent and parallel to the lower end wall 16. In particular, the inside surface 25 of the lower end wall 16 forms a solid guide surface which guides the liquid from the inlet 23 to the collection wall 18.

Figure 3:
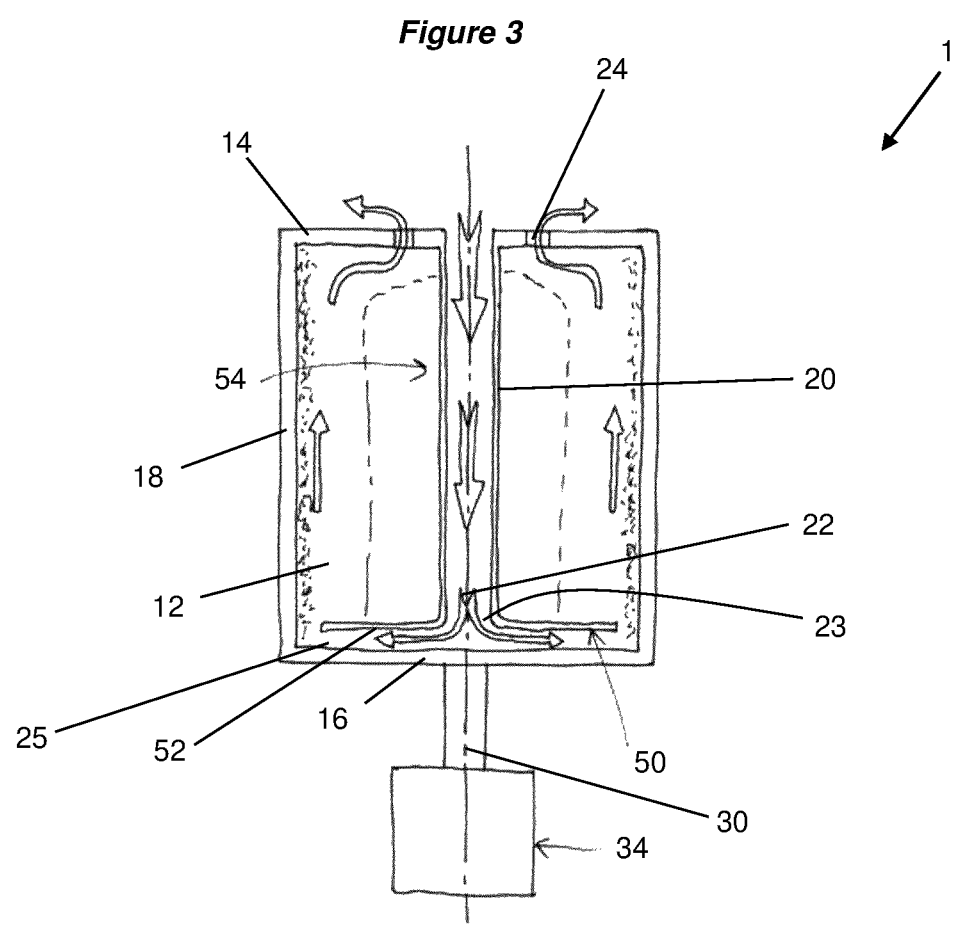
FIG. 3 is a schematic drawing of a filter unit according to a third embodiment.

Turning to FIG. 3, this shows an embodiment of filter unit 10 including a flange 50, in particular a lower flange. The flange 50 extends radially outwardly from the axial open end 23 of the conduit. The radial spacing (i.e. the transverse annular spacing) between the outer edge of the flange 50 and the collection wall 18 is smaller than the radial spacing between the central longitudinal axis of the inlet conduit 20 and the outer edge of the flange (i.e. the outer edge of the flange is closer to the collection wall 18 than the central longitudinal axis of the inlet conduit 20). This advantageously ensures that the majority of the liquid introduced into the chamber is diverted radially outwards towards the collection wall 18 of the chamber 12 where it will be subject to higher centrifugal forces. The axial component of the liquid along the collection wall 18 is therefore closer to and preferably directly adjacent the collection wall 18 (i.e. the axial component of the flow path is directly adjacent to the outer edge of the chamber 12). In this embodiment, the lower surface 52 of the flange 50 forms a guide surface. The inside surface 25 of the lower end wall 16 and the lower surface 52 of the flange 50 both provide solid guide surfaces to guide the liquid from the inlet 23 to the collection wall 18.

In the embodiment of FIG. 3, the outlet is an annular opening 24 centred on the axis of rotation 30. The radial spacing from the axis of rotation 30 to the annular opening 24 is less than the radial spacing from the annular opening 24 to the collection wall 18 (i.e. the annular opening 24 is closer to the axis of rotation 30 than to the collection wall 18).

The filter unit 10 of FIG. 3 includes a solid core 54 (shown in outline so as not to obscure the other parts of the filter unit). The solid core 54 circumscribes the inlet conduit 20 and blocks out a central area of the chamber. The solid core 54 diverts the liquid towards the collection wall 18 where it will be subject to the higher centrifugal forces. The solid core 54 extends radially across 50% of the transverse width of the chamber. The solid core 54 extends axially from the flange 50 to proximal the upper end wall 14.

FIG. 2 illustrates the types of outlets that may be provided in embodiments of the filter unit 10. As described above, the outlet may be an annular opening 24 which circumscribes the inlet conduit 20. In some embodiments, the outlet may include an opening 46 radially spaced from the inlet conduit 20. As shown by the figure, the annular opening can be sealed off by a rotary seal 42 if required such that the liquid exits only via the opening 46.

Figure 4:
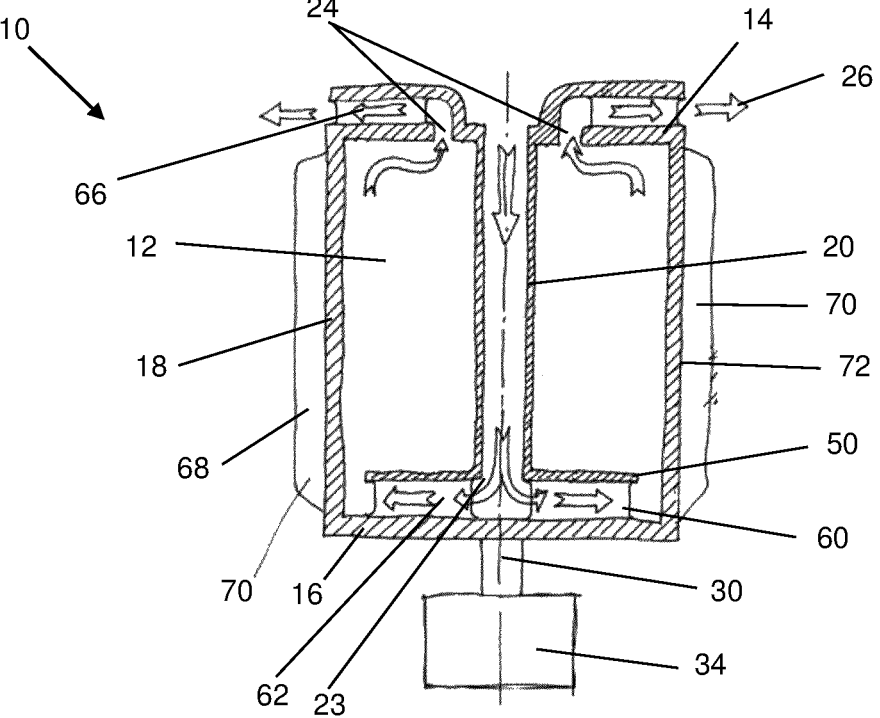
FIG. 4 is a cross-sectional view of a filter unit according to a fourth embodiment.

Turning to FIG. 4, this embodiment of filter unit 10 includes an inlet impeller 60 immediately downstream of the open end 23 of the inlet conduit 20, between the flange 50 and the lower end wall 16. The inlet impeller 60 central axis is coaxial with the axis of rotation 30. The vanes 62 of the inlet impeller 60 lie transversely/radially across the chamber such that the inlet impeller 60 is rotatable perpendicular to the central longitudinal axis of the chamber. The inlet impeller 60 is configured to increase the flow rate of the liquid entering the chamber 12 and suction liquid into the chamber 12.

The filter unit 10 also includes an outlet impeller 66 immediately downstream of the outlet 24. Similar to the inlet impeller 60, the central axis of the outlet impeller 66 is coaxial with the axis of rotation 30 and the outlet impeller 66 is rotatable perpendicular to the central longitudinal axis of the chamber. The outlet impeller 66 is configured to increase the flow rate of the liquid through the chamber 12 and the flow rate of the liquid exiting the chamber 12.

The filter unit 10 of FIG. 4 also includes an exterior impeller 68 located on the external face 72 of the collection wall 18. The vanes 70 of the exterior impeller 68 extend radially outward from the external face 72 of the collection wall 18 and extend along the axial length of the chamber 12. The exterior impeller 68 advantageously enables the filter unit 10 to act as a pump.

Figure 5:
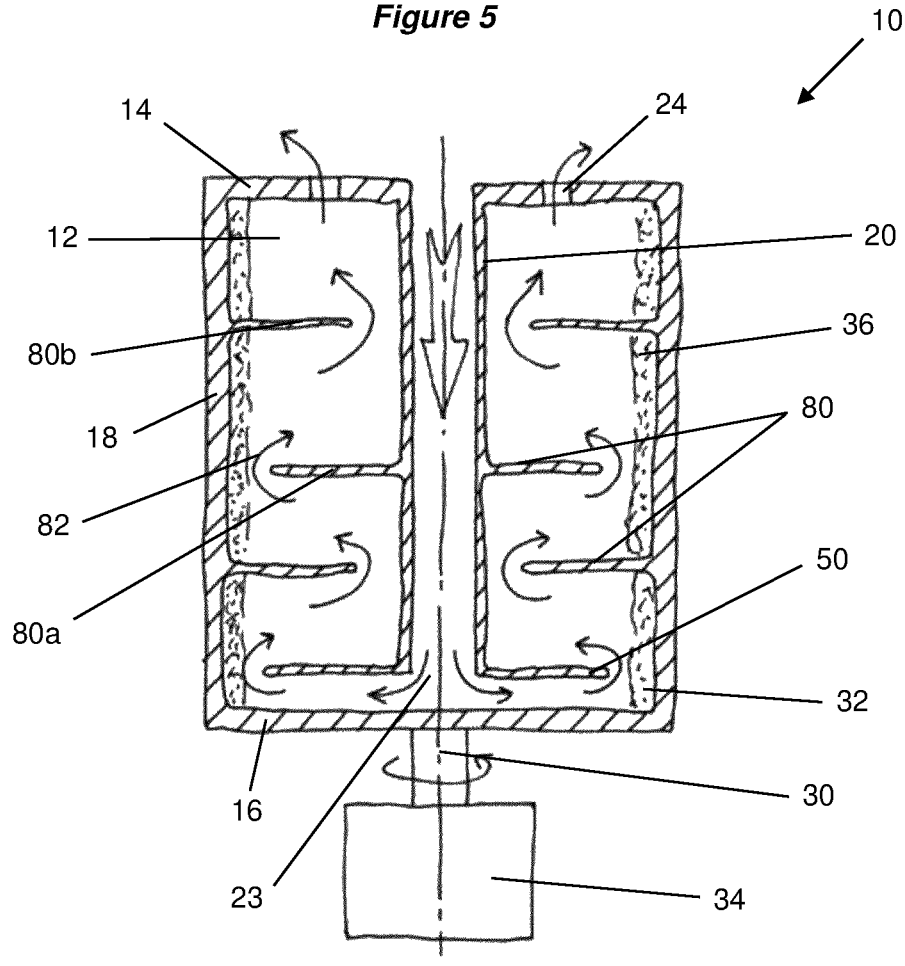
FIGS. 5 to 7 show embodiments of the filter unit including various baffle arrangements.

FIGS. 5 to 8 show various baffle arrangements that may be included with the filter unit 10. Turning first to FIG. 5, the chamber 12 includes a series of alternating outwardly extending baffles 80a and inwardly extending baffles 80b. The outwardly extending baffles 80a extend radially outward from the inlet conduit 20 to proximal the collection wall 18 and extend around the entire circumference of the inlet conduit. The inwardly extending baffles 80b extend radially inward from the collection wall 18 to proximal the inlet conduit 20 and extend around the entire circumference of the collection wall 18. The baffles are configured to divert the flow of liquid around the baffles as indicated by the arrows 82. This advantageously increases the flow path of the liquid as it travels from the inlet 23 to the outlet 24, thereby increasing the dwell time of the filter unit.

Figure 7:
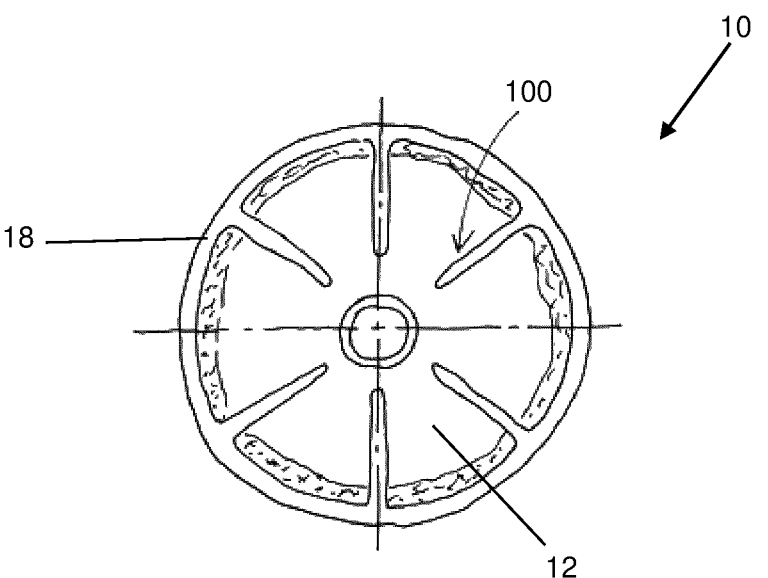

FIG. 7 shows a filter unit 10 where the chamber 12 includes a plurality of axially extending ribs 100. The ribs 100 extend radially in from the collection wall 18 to proximal the inlet conduit 20. The ribs are equally radially spaced around the circumference of the chamber 12 and extend axially across the entire longitudinal length of the chamber 12. Including ribs increases the filtration efficiency of the filter unit.

Figure 6:
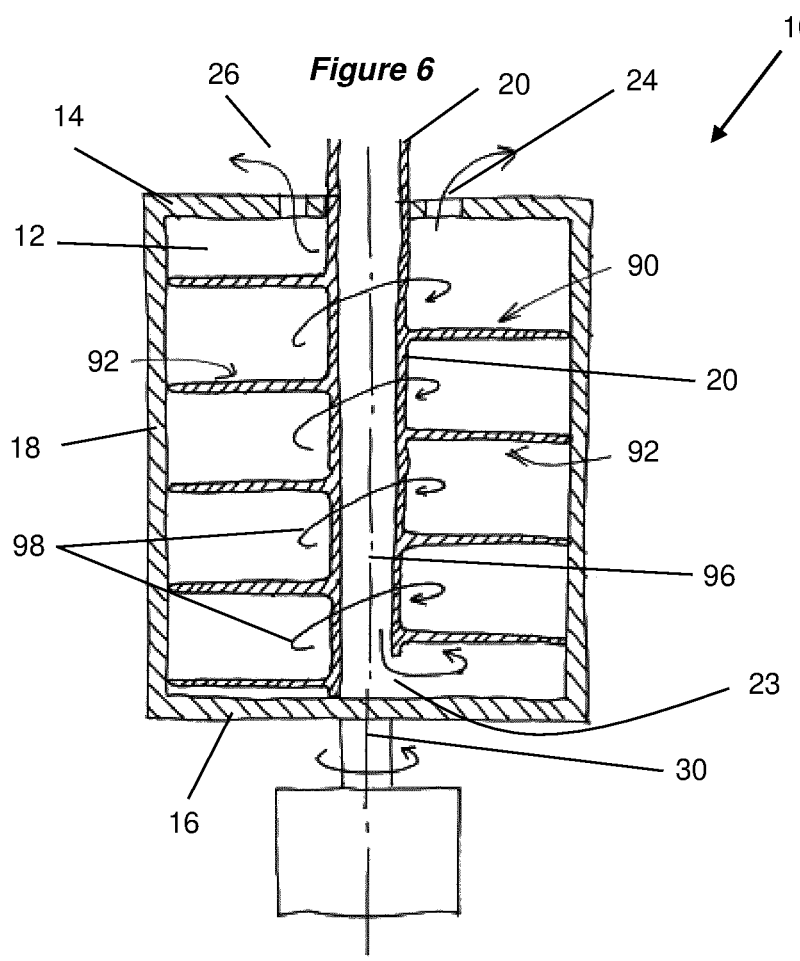

FIG. 6 shows a filter unit 10 where the chamber 12 includes a helical baffle 90 extending radially around the inlet conduit 20. The vanes 92 of the helical baffle 90 extend radially from the inlet conduit 20 to the collection wall 18. In use, this forces the liquid to travel in a spiral around the inlet conduit 20. In this embodiment, the inlet conduit 20 includes an opening 23 in the wall of the conduit for delivering the particulate-laden liquid.

Figure 8:
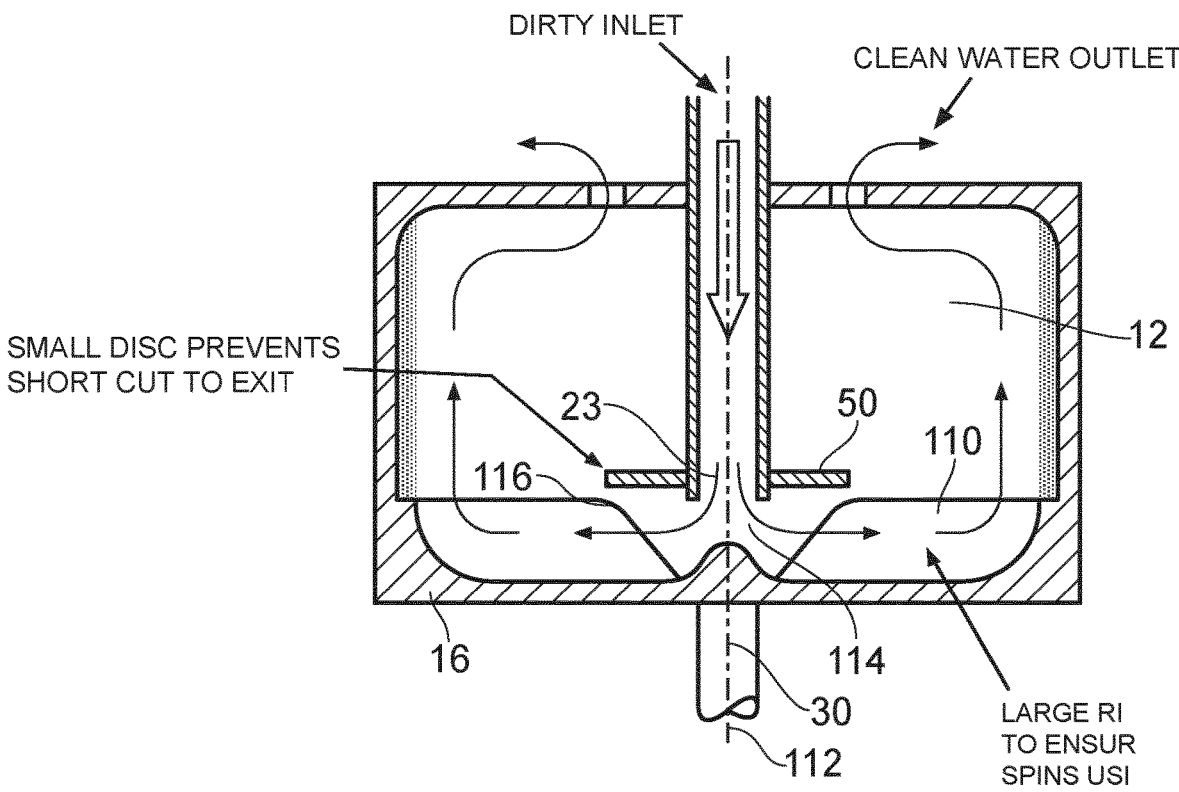
FIG. 8 is a cross-sectional view of a filter unit according to a further embodiment.

FIG. 8 shows a filter unit 10 with the chamber 12 including a series of ribs 110. The ribs 110 extend radially inwards from the collection wall 18 and are uniform with the lower end wall 16. Thus the ribs 110 are rotatable at the same rotational speed as the chamber 12.

The ribs 110 are radially spaced from the axial centre 112 of the chamber 12. An area 114 downstream of the inlet is free of ribs 110 to enable the delivered liquid to enter the chamber 12. The inner upper corners 116 of the ribs 110 are chamfered or rounded to avoid debris collecting on the ribs and blocking the inlet. This advantageously promotes smooth flow of liquid into the chamber. In this embodiment, the flange 50 and the inlet conduit 20 extend radially across 30% or less of the diameter of the chamber.

The ribs 110 extend axially along a quarter of the axial length of the chamber 12 and are evenly radially distributed about the central longitudinal axis 112 of the chamber 12.

The ribs 110 are rotatable about the axis of rotation 30 and, in use, are configured to rotate the liquid within the chamber.

The ribs are rotatable at the same rotational speed as the chamber. Thus, the ribs can advantageously force the liquid to rotate at the same rotational speed as the chamber. Without the ribs, the liquid rotates at a slower rotational speed than the rotating chamber, which may result in reduced filtration efficiency. Including the ribs ensures that the liquid in the chamber is rotating at the same rotational speed as the rotating chamber. This may result in greater filtration efficiency and may also enable running the filter unit at high flow rates (e.g. 15-20 litres/min) while still achieving high filtration efficiency.

In this embodiment, the distance from the axial centre of the inlet conduit to the radially outer edge of the lower flange is 40% of the radius of the chamber (i.e. the inlet conduit/lower flange occupy around 40% of the diameter of the chamber) so as to not interfere with the ribs.

Figure 9:
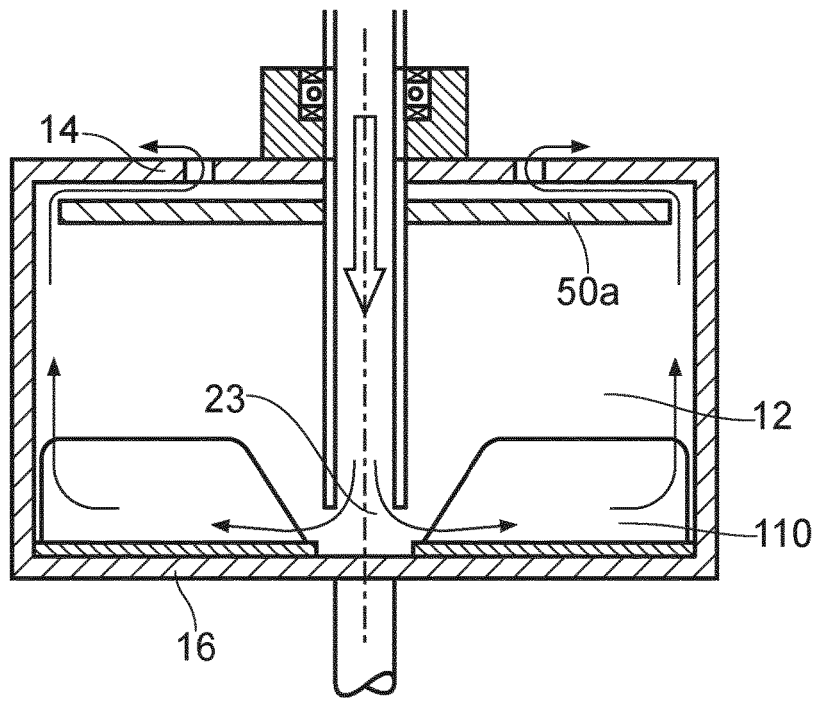
FIG. 9 is a cross-sectional view of a filter unit according to a further embodiment.

FIG. 9 shows a filter unit 10 with a series of ribs 110 (as described above) and an upper flange 50*a* towards the upper end wall 14. The axial spacing between the upper end wall 14 and the upper flange 50*a* is less than 10% of the axial length of the chamber 12. This prevents the flange from interfering with the ribs 110.

Figures 10, 11:
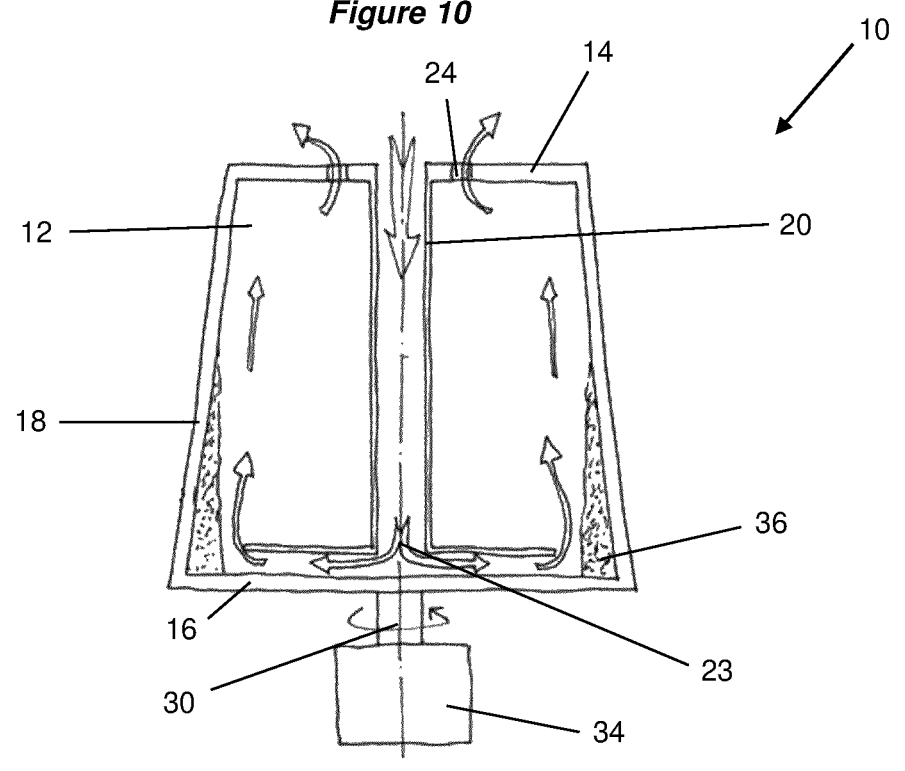
FIG. 10 is a cross-sectional view of a filter unit according to a further embodiment.
FIG. 11 is a cross-sectional view of a filter unit according to a further embodiment.

Turning now to FIG. 10, this shows the filter unit 10 with tapered collection walls 18 (i.e. the chamber is frustoconical). In this embodiment, the collection wall 18 tapers outwardly from the upper end wall 14 to the lower end wall 16. As can be seen in FIG. 10, this can advantageously encourage the particulate matter 36 to concentrate at the widest part of the chamber 12.

FIG. 11 shows the filter unit 10 including an annular bearing and seal 120 around the inlet conduit 20 at the upper end wall 14.

Figure 12:
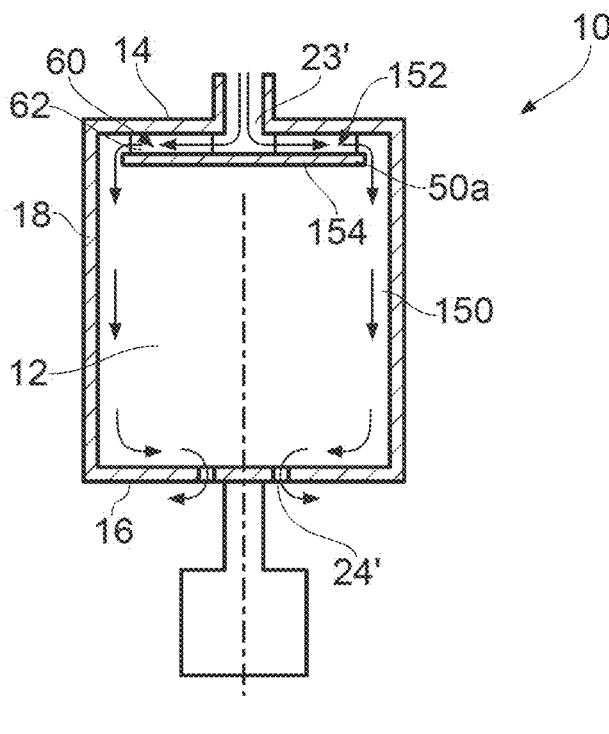
FIG. 12 is a cross-sectional view of a filter unit according to a further embodiment.
Figure 13:
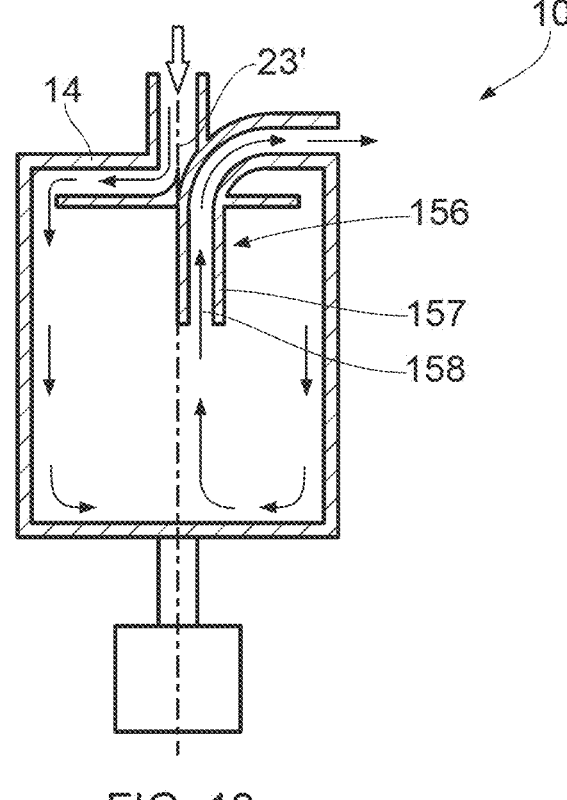
FIG. 13 is a cross-sectional view of a filter unit according to a further embodiment.

FIGS. 12 and 13 show two alternative arrangements of filter unit 10. Referring first to FIG. 12, this shows a filter unit 10 with an inlet opening 23' at the upper end wall 14 and a pair of outlet openings 24' at the lower end wall 16. The flow path of the liquid, indicated by arrows 150, includes a radial component from the inlet 23' to the collection wall 18 and an axially downwards component along the collection wall 18. The embodiment of FIG. 12 also includes an inlet impeller 60 and an upper flange 50*a*. The vanes 62 of the inlet impeller 60 connect the upper flange 50*a* to the upper end wall 14. The inside surface 152 of the upper end wall 14 and the upper surface 154 of the upper flange 50*a* provide solid guide surfaces to guide the liquid from the inlet 23' to the collection wall 18.

FIG. 13 shows a filter unit 10 with an inlet opening 23' at the top end wall 14 and an outlet in the form of a vortex finder 156. The vortex finder 156 includes a conduit 157 with an outlet opening 158 for discharging liquid from the chamber 12. The vortex finder 156 extends through the upper end wall 14 and out of the chamber 12.

Figures 14, 15:
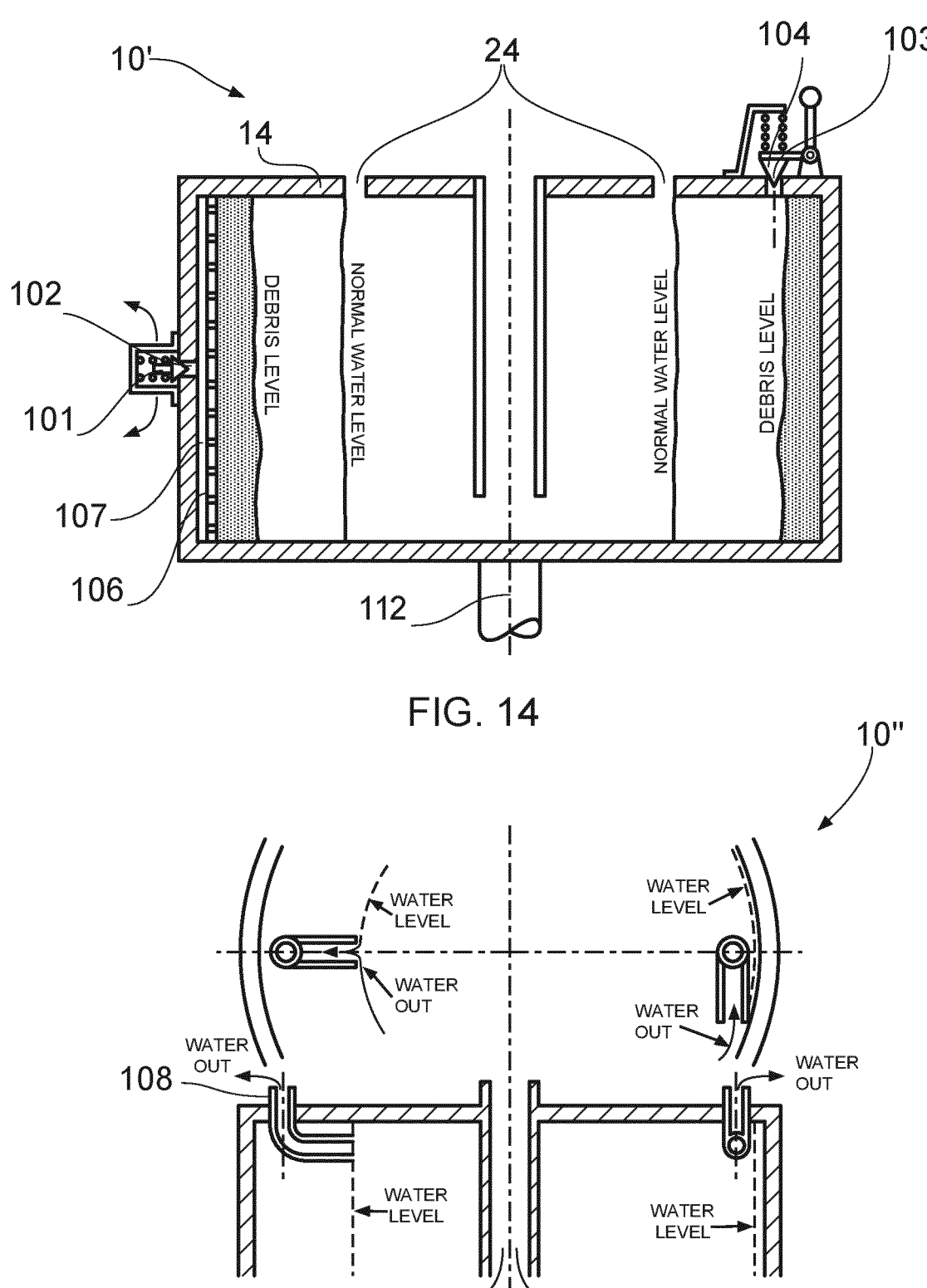
FIGS. 14 and 15 show embodiments of filter unit for dewatering.

FIGS. 14 and 15 show two embodiments of filter unit 10', 10" for dewatering the chamber. Turning first to FIG. 14, this figure shows two example locations for drain holes in the chamber.

The filter unit includes outlets 24 in the upper end wall and may include a drain hole 102 in the collection wall or a drain hole 104 in the upper end wall. Each drain hole 102, 104 includes a centrifugal valve 101, 103. Drain hole 104 in the upper end wall is axially spaced from the central longitudinal axis 112 of the chamber. The axial spacing between the central longitudinal axis of the chamber 112 and the drain hole 104 is larger than the axial spacing between the drain hole 104 and the collection wall. The filter unit includes a mesh lining 106 on the inside face 107 of the collection wall.

FIG. 15 shows a top section view and a cross-sectional view of a filter unit 10" including an 'L' shaped outlet conduit 108 extending through the upper end wall. The 'L' shaped outlet conduit is axially rotatable between a first use position (shown on the left side of the Figure) where the outlet is pointing radially inwards to a second dewatering position (shown on the right side of the Figure) where the pipe is rotated by 90 degrees. The filter unit includes a mechanical linkage (not shown) for rotating the 'L' shaped outlet conduit between the first use position and the second dewatering position.

Figure 18:
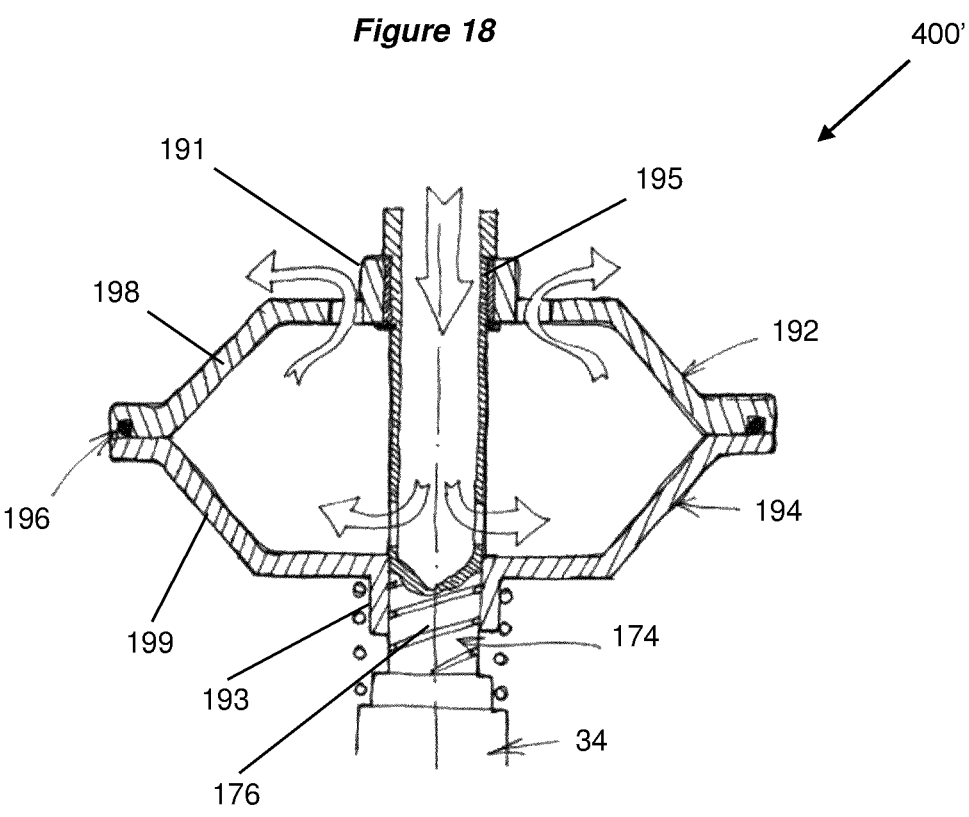
FIGS. 18 and 19 show a further embodiment of filter unit in a closed and an open position.
Figure 19:
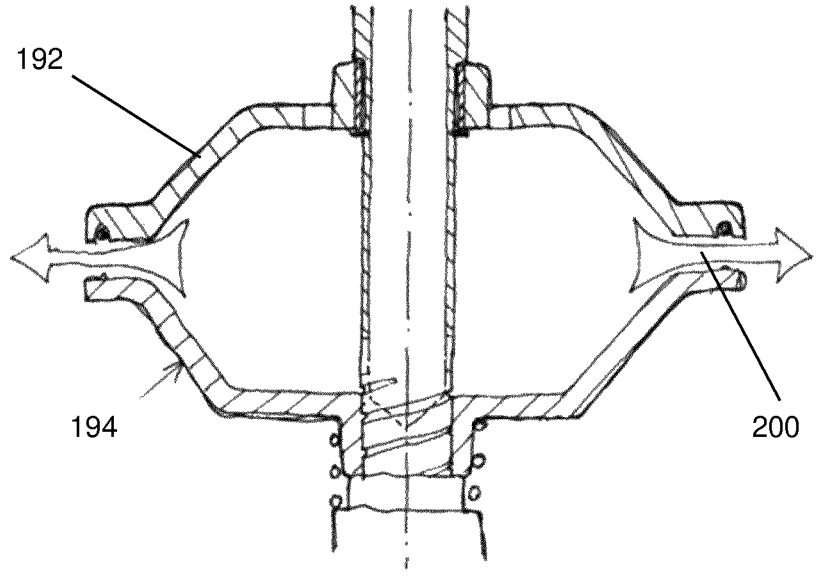
Figure 20:
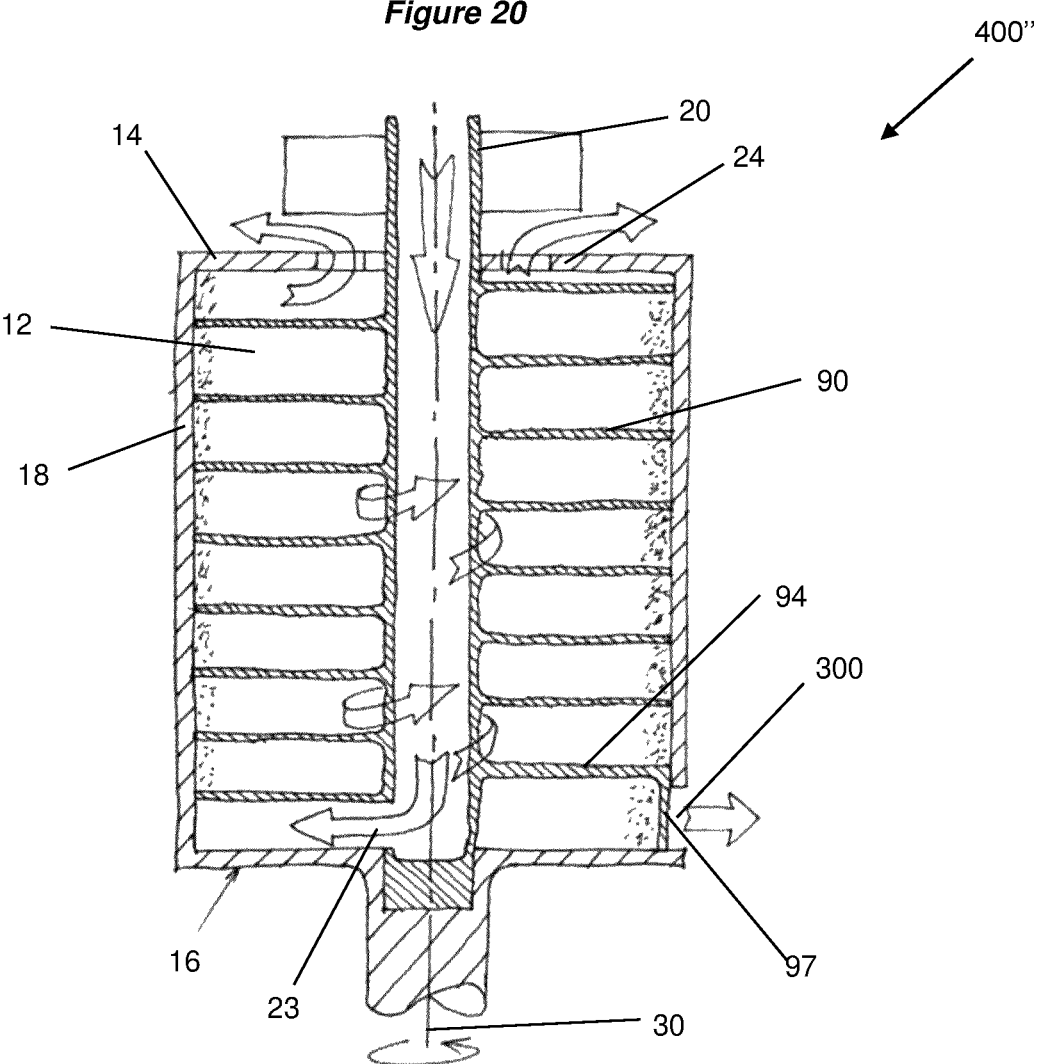
FIG. 20 is a cross-sectional view of a filter unit according to a further embodiment.

Referring now to FIGS. 16 to 20, these show embodiments of filter unit which can dispense the collected particulate matter out of the chamber. Referring first to FIG. 20, the filter unit 400" shows the chamber 12 including a particle dispense opening 300 in the collection wall 18, in particular towards the bottom of the collection wall 18. The particle dispense opening 300 is openable for dispensing particulate matter out of the chamber 12. The chamber 12 includes a helical baffle 90 about the inlet conduit 20 similar to the one described above. In this embodiment, one of the vanes, in particular the lowest-most vane 94 of the helical baffle 90 includes a lateral wall 97 which extends around the circumference of the chamber 12. The lateral wall 97 includes an opening (not shown) which is alignable with the particle dispense opening 300. The helical baffle 90 is rotatable about the axis of rotation 30 such that the lateral wall opening can be aligned with the particle dispense opening 300 and particulate matter dispensed from the chamber via the open particle dispense opening 300. The helical baffle 90 is advantageously shaped as an Archimedean-style screw such that rotation of the helical baffle 90 pushes particulate matter collected on the collection wall 18 downwards towards the particle dispense opening 300.

FIGS. 18 and 19 show an embodiment of filter unit 400' where the chamber is formed of an upper casing component and a lower casing component. In this embodiment, the upper casing component is an upper casing half 192 and the lower casing component is a lower casing half 194. The upper 192 and lower 194 casings halves are movable between a closed position (shown in FIG. 18) and an open position (shown in FIG. 19). In the closed position, the upper 192 and lower 194 casing halves join together at a peripheral joint 196 to form a closed chamber. The peripheral joint 196 forms a fluid tight seal. In the open position, the upper 192 and lower 194 casing halves are separated at the peripheral joint forming an annular particle dispense opening 200 between the casing halves. The peripheral collection walls 198, 199 of the upper 192 and lower 194 casing halves taper outwardly towards the peripheral joint 196, such that the widest part of the chamber 12 is at the peripheral joint 196. This advantageously enables the particulate matter to concentrate at the peripheral joint 196 so that it can be readily extracted from the annular particle dispense opening 200 as the upper 192 and lower 194 casing halves move to the open position.

In this embodiment, the inlet conduit forms the drive shaft 174 of the motor 34 and the outer surface of the inlet conduit includes a screw thread 176. The inlet conduit 174 is rotatable by the motor 34 such that the inlet conduit 174 can act as a lead screw.

The upper 192 and lower 194 casing halves are mounted and transversely/radially constrained to the inlet conduit 174 by each casing half respectively including a longitudinal slot/bore 191, 193 for receiving the inlet conduit 174. Thus, as the upper and lower casing halves move between the closed and the open positions, the casing halves remain axially aligned (i.e. their central axes remain coincident) with the inlet conduit and thus with each other.

The inner surface of the axial slot/bore 193 of the lower casing half 194 includes a screw thread which connects to the screw thread 176 on the inlet conduit 174. The lower casing half 194 is therefore axially driveable by the screw thread 196. The inner surface of the axial slot 191 of the upper casing half 192 is smooth such that the upper casing half 192 is freely rotatable about the inlet conduit 174. The upper casing half 192 is axially constrained to the inlet conduit by the axial slot 191 being slottable (retained or constrained) into a groove 195 in the wall of the inlet conduit 174.

Figure 16:
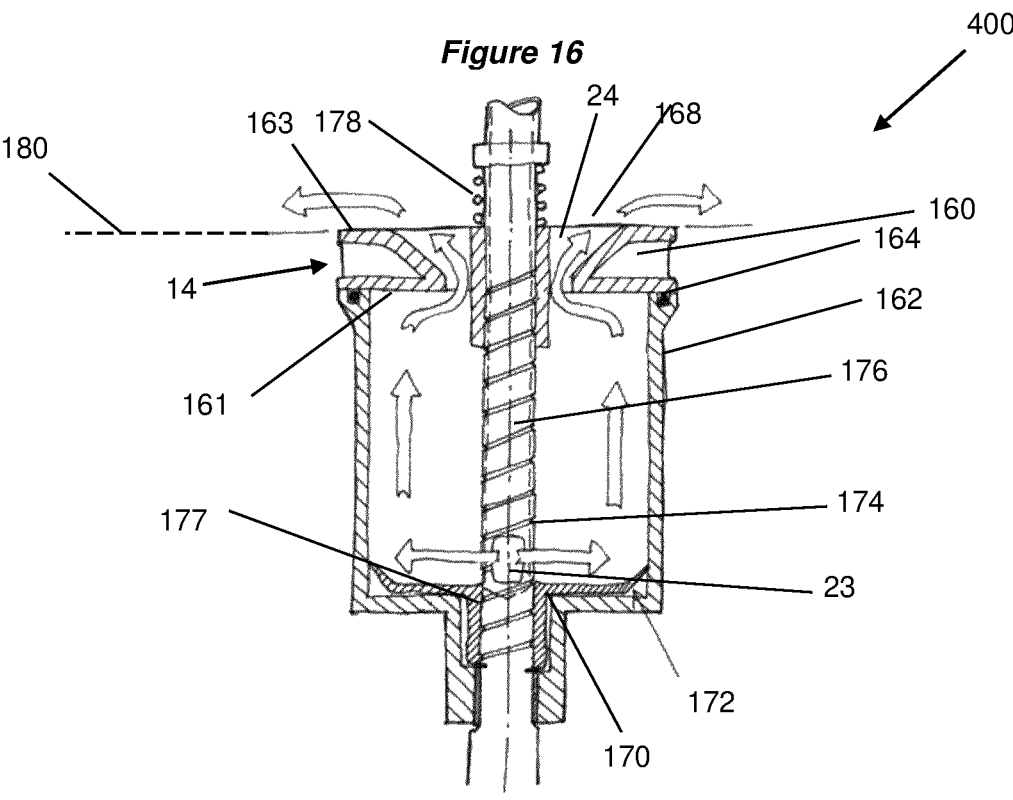
FIGS. 16 and 17 show a further embodiment of filter unit in a closed and an open position.
Figure 17:
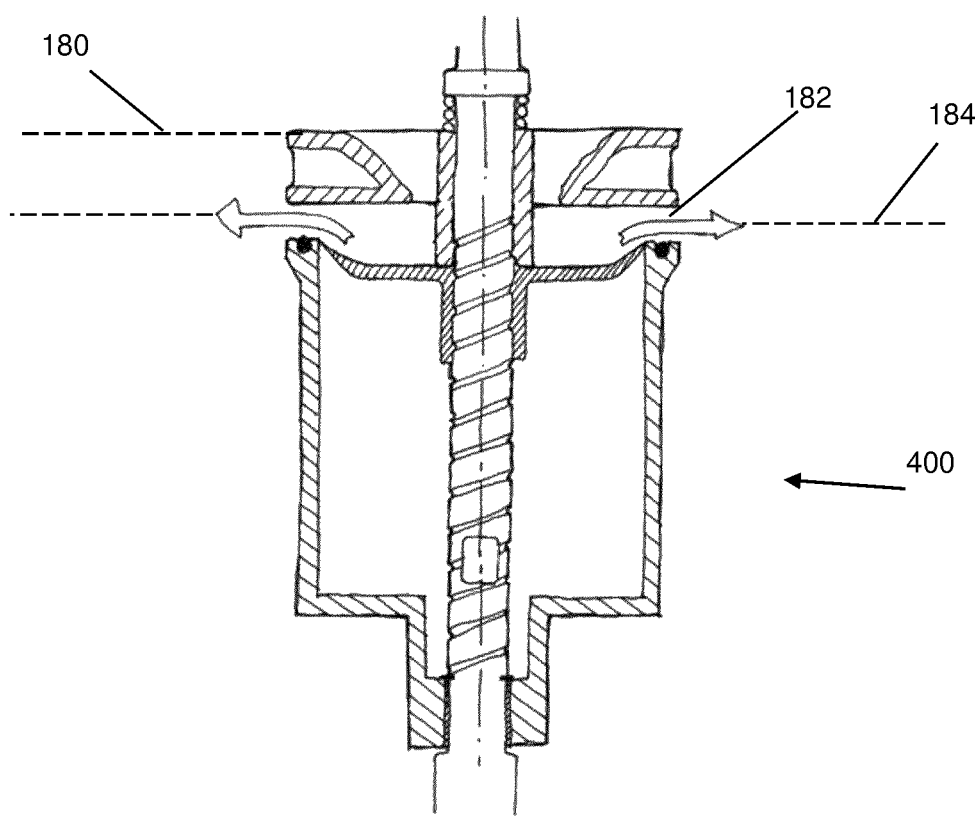

FIGS. 16 and 17 show an embodiment of filter unit 400 where the chamber is formed of an upper casing component 160 and a lower casing component 162 which join at a peripheral joint 164. In practice, the upper casing component 160 forms a lid of the chamber and the lower casing component 162 forms a base of the chamber. The upper casing component 160 includes the upper end wall 14 and the outlet includes an opening 168 in the upper casing component 160. The outlet 168 is outwardly tapered (i.e. from the inside surface 161 of the upper end wall 14 to the outside surface 163 of the upper end wall 14. The outwardly tapered outlet advantageously encourages the ejected liquid to move upwards and outwards along plane 180 as it exits the chamber 12.

The filter unit of FIGS. 16 and 17 includes a scraping plate 170. The scraping plate 170 extends radially cross the entire width of the chamber 12 and includes a sharpened upwardly angled edge 172. The scraping plate 170 is axially moveable up and down the inlet conduit 174 between a lower locking position (shown in FIG. 16) and an upper engaging position (shown in FIG. 17).

The scraping disc is mounted to the inlet conduit 174 and includes an axial slot/bore 177 for receiving the inlet conduit 174 so as to transversely/radially constrain the scraping plate 170 to the inlet conduit 174. The inner surface of the axial slot 177 includes a screw thread which connects to the screw thread 176 on the inlet conduit 174, i.e. the scraping plate 170 is connected to the screw thread 176 on the inlet conduit 174 such that the scraping plate 170 is driveable axially up and down the inlet conduit 174 by rotation of the screw thread 176. The scraping plate 170 is lockable to the lower casing component 162 when in the lower locking position.

In this embodiment, the upper 160 casing component is biased towards the closed position (i.e. the upper casing component 160 is biased towards the lower casing component 162) by a helical spring 178. The spring 178 is located axially above the upper casing component 160 and circumscribes the inlet conduit.

In this embodiment, the upper 160 and lower 162 casing components are freely rotatable about the inlet conduit.

Figure 21:
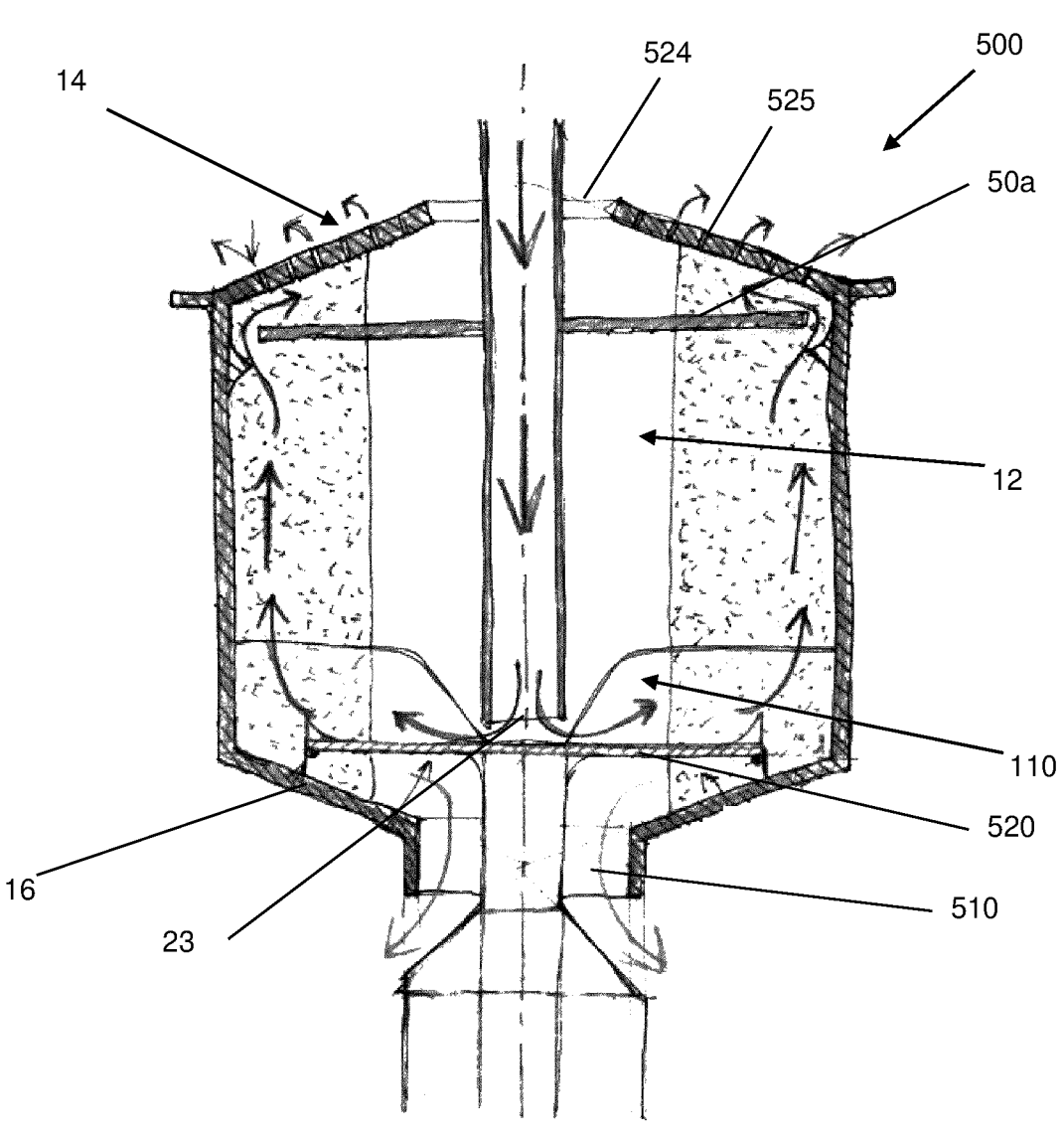
FIG. 21 is a cross-sectional view of a filter unit according to a further embodiment.

FIG. 21 shows a further embodiment of filter unit 500 where the particle dispense opening 510 is in the lower end wall. The filter unit 500 includes a guide plate 520 located between the lower end wall 16 and the inlet 23 and which is configured to guide the liquid radially from the inlet to the collection wall. The guide plate is connected to the lower end wall 16 such that as the chamber rotates, the guide plate rotates in the same direction and at the same speed as the chamber. The filter unit 500 includes tapered upper 14 and lower 16 end walls. The filter unit 500 includes an annular outlet aperture 524 in the upper end wall 14 which circumscribes the inlet conduit and a series of outlet openings 525 in the upper end wall 14 either side of the inlet conduit. The series of openings 525 are concentrically arranged in the upper end wall 14 of the chamber.

The filter unit 500 also includes a series of ribs 110 and an upper flange 50a as described above. The ribs 110 form part of the guide plate 520 (e.g. are uniform with or attached to the guide plate) such that as the guide plate rotates (with the chamber), the ribs rotate in the same direction and at the same rotational speed as the guide plate (and thus the chamber). The guide plate 520 is connected to the lower end wall by a pair of mechanical arms. The mechanical arms are configured to move the guide plate axially upwards so as to create space between the lower end wall 16 and the guide plate 520 and thereby opening the particle dispense opening 510. The mechanical arms are configured to move the guide plate axially downwards so as to close the particle dispense opening 510.

Figure 22:
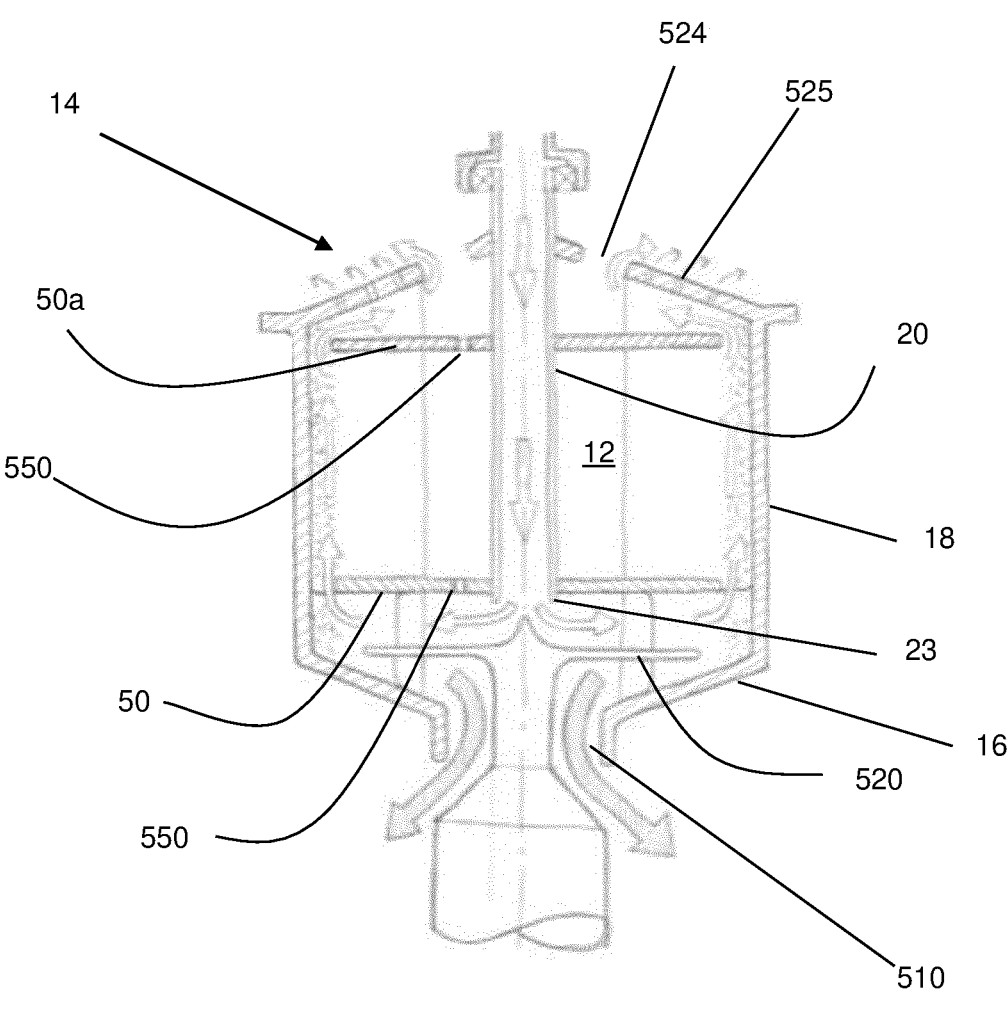
FIG. 22 is a cross-sectional view of a filter unit according to a yet further embodiment.

FIG. 22 shows an embodiment of a filter unit 500 that is similar to that shown in FIG. 21 except that the guide plate is mounted to the lower end wall on ribs and is not axially moveable within the chamber. The particle dispense opening 510 is permanently open to the chamber i.e. the guide plate does not seal against the lower end wall 16 but the ribs define channels which provide access to the particle dispense opening 510. The particle dispense opening 510 (in the lower end wall) has a smaller diameter than the annular outlet aperture 524 (in the upper end wall). The inlet conduit has a lower flange 50 and an upper flange 50a. Both include a respective vent 550 which comprise an aperture or channel extending through the flanges which allow balancing of air pressure (and thus water levels) either side of the flanges.

Any of the upper or lower flanges 50a, 50 shown in previous embodiments may have such a vent.

FIG. 23 shows the filter unit 500 of FIG. 22 further comprising a secondary (lower) chamber 560 in fluid communication with the particle dispense opening 510. The secondary chamber 560 is integrally formed with the (primary) chamber 12.

The secondary chamber 560 has an upper axial end wall 14a with an opening in fluid communication with the particle dispense opening. The upper axial end wall 14a of the secondary chamber 560 may have a secondary outlet e.g. a series of outlet apertures 525a arranged in a ring on the upper axial end wall 14a of the secondary chamber 560. The secondary outlet aperture(s) 525a are radially outwards of the outlet(s) 524, 525 in the upper axial end wall 14 of the (primary) chamber 12. The secondary chamber 560 may have a lower axial end wall 16a with a second (lower) particle dispense opening 510a. It may have peripheral collection walls 18a extending between the upper and lower axial end walls 14a, 16a of the second chamber 560.

A collection cup 561 having a receiving recess 562 with a collection opening 563 facing the particle dispense opening 510 of the primary chamber 12 may be provided in the second (lower) chamber 560. The collection cup 561 is mounted on an axial mount/rotor 564 upon which the guide plate 520 in the (primary) chamber 12 is mounted. The collection cup 561 has tapered walls 565 such that the collection opening 563 is wider than the base of the collection cup 561. In use, the filter unit 10, 400, 500 is configured to be operated in the use configuration. Particulate-laden liquid is introduced into the chamber 12 via the inlet 23 and the filter unit 10, 400, 500 is operated to rotate the chamber 12 about the axis of rotation 30 so as to impart rotational motion to the liquid. In particular, the motor 34 is operated to rotate the chamber 12 at a first speed. Rotating the chamber at the first speed causes the liquid in the chamber to create a vortex. Thus, the liquid in the chamber 12 moves radially from the inlet 23 to the collection wall 18 and then axially along the collection wall 18 before being discharged out of the chamber 12 via the outlet(s) 24, 524, 525.

In embodiments where the inlet is below the outlet (e.g. the inlet is towards the lower end wall or the inlet is at the top end wall and the outlet is a vortex finder), the liquid vortex allows the water to travel axially upwards towards the outlet.

Rotating the chamber at the first speed results in centrifugal forces being generated in the rotating liquid that are orders of magnitude greater than the gravitational forces acting on the liquid. In the embodiments described above, the chamber 12 is rotated at a first speed of 4000 rpm generating centrifugal forces of up to 15000 ms$^{-2}$ in the liquid at the periphery. The centrifugal forces in the liquid force particulate matter within the liquid away from the axis of rotation and against the collection wall 18, forming a layer of particulate matter against the collection wall 18.

In some embodiments, the inlet conduit 20 and the lower flange 50 are rotated in the same direction and at the same rotational speed as the chamber 12.

In embodiments including the lower flange 50 and/or the solid core 54, the liquid in the chamber is diverted radially outwards towards the collection wall. The diverted liquid flows axially nearer to the outer edge of the chamber where it is subject to higher centrifugal forces.

In embodiments including the ribs 110, the ribs 110 rotate at the same rotational speed as the chamber 12. The ribs rotate the liquid within the chamber at the same rotational speed as the chamber. This may enable running the filter unit at higher flow rates while still achieving high filtration efficiency.

Once the available liquid has been passed through the filter unit 10 (or once all the available liquid has been filtered), liquid is no longer introduced into the chamber and any remaining liquid in the chamber is ejected from the outlet.

With reference to FIGS. 21, 22 and 23, the chamber is configured to be rotated at the first speed and particulate-laden liquid is introduced into the chamber 12. Particulate matter is collected against the collection wall and filtered liquid is ejected from the annular outlet opening 524. Once the available liquid has been passed through the filter unit 500, liquid is no longer introduced into the chamber. Any remaining liquid in the chamber 12 is ejected from the outlets 525. Once the remaining liquid has been ejected from the chamber, the chamber may stop rotating. In this embodiment, the chamber can advantageously collect the particulate-matter from the liquid and eject any remaining liquid from the chamber by rotating the chamber at the first speed. As the chamber stops rotating, the particulate matter collected against the collection wall is allowed to fall (under gravity) out of the particle dispense opening 510.

In FIG. 21, the guide plate 520 is moveable axially upwards to create additional space between the lower end wall and the guide plate, opening the particle dispense opening 510 and allowing the particulate matter to fall out of the particle dispense opening 510 in the lower end wall. The guide plate is moveable axially downwards so as to close the particle dispense opening.

In FIGS. 22 and 23, the guide plate 520 does not seal against the lower end wall 16 and the particle dispense opening 510 remains open during operation e.g. rotation at the first speed. During filtration, the liquid within the filter moves upwardly towards the outlets 524, 525 rather than out of the (smaller diameter) particle dispense opening. This is a result of the centrifugal force creating a toroidal wall of liquid with an inner diameter defined by the diameter of the annular outlet aperture 524. Only when the chamber stops rotating does the particulate matter collected on the collection wall 18 fall (under gravity) out of the chamber through the particle dispense opening 510. In the cases where the remaining liquid in the chamber is not ejected from the chamber when rotating the chamber at the first speed, the filter unit is configured to be operated in the dewatering configuration, to drain the residual liquid from the chamber.

In FIG. 23, the paste or concentrated liquid containing particulate matter is ejected (under gravity) from the particle dispense opening 510 of the (primary) chamber 12 into the secondary chamber 560 where it is collected in the collection cup 561.

Upon recommencement of rotation of the filter unit 500, the concentrated liquid/paste moves up the tapered walls 565 from the base of the collection cup 561 under centrifugal force and is flung from the cup onto the peripheral walls 18a of the secondary chamber 560. Any liquid within the concentrate/paste is ejected from the outlet(s) 525a in the upper axial end wall 14a so that the concentrate/paste is further concentrated. The particulate matter collected on the peripheral walls 18a of the secondary chamber 560 is expelled from the filter unit 500 under gravity through the lower particle dispense opening 510a once rotation ceases.

Referring to FIG. 14, the motor is operated to rotate the chamber 12 at a second rotational speed, the second rotational speed being faster than the first rotational speed. The second speed is 20% higher than the first speed. Rotating the chamber 12 at the second rotational speed opens the centrifugal valves in the drain holes allowing any remaining residual liquid in the chamber 12 to drain from the drain holes. In the embodiments of filter unit including drain holes in the collection wall, all of the residual liquid is drained from the chamber. Thus, rotating the chamber 12 at the second rotational speed also dries the layer of particulate matter collected on the collection wall 18. Drying the particulate matter advantageously facilitates removal of the particulate matter from the chamber 12. In embodiments of filter unit including drain holes in the upper end wall, liquid is drained from the use liquid level down to the dewatering liquid level. Liquid within the area of the axial spacing between the drain hole and the collection wall is not drained, leaving a paste/concentrated liquid containing particulate matter. Draining the particulate matter to a paste may be advantageous in certain circumstances. Drying the paste/concentrated liquid to a solid (e.g. by evaporation) may make it easier to handle and therefore facilitate removal of the particulate matter from the chamber.

With reference to FIG. 20, once the particulate matter in the liquid has been collected, the filter unit is dewatered and the layer of particulate matter collected against the collection wall is dried as described above.

The filter unit 400 is then further rotated and the helical baffle 90 rotated relative to the chamber. The helical baffle 90 is rotated relative to the chamber 12 by rotating the chamber at given speed (e.g. 500 to 3000 rpm) and rotating the helical baffle by 30-60 rpm faster or slower than the chamber 12 such that eventually the lateral wall opening will align with the particle dispense opening 300. Once the lateral wall opening aligns with the particle dispense opening 300 (i.e. the particle dispense opening 300 is opened) the chamber continues to rotate thereby ejecting the particulate matter radially out from the chamber 12. Continued rotation of the helical baffle 90 relative to the chamber eventually mis-aligns the lateral wall opening with the particle dispense opening 300 such that the particle dispense opening 300 is closed. Rotating the helical baffle 90 relative to the chamber 12 advantageously achieves two purposes: (i) the particulate matter collected on the collection wall is pushed downwards towards the particle dispense opening 300; and (ii) the particle dispense opening 300 is periodically opened by the lateral wall opening aligning with the particle dispense opening 300 so that particulate matter can be ejected out of the chamber. The particle dispense opening 300 is therefore opened once sufficient particulate matter has been pushed from the collection wall 18 to the particle dispense opening 300.

Referring to FIGS. 18 and 19, the motor 34 is operated to rotate the inlet conduit 174 in the first direction with the upper 192 and lower 194 casing halves in the closed position. Rotation of the inlet conduit 174 in the first direction rotates the lower casing half 194 in the first direction. Inertia (or seal friction) between the upper 192 and the lower 194 casing halves causes the upper 192 casing half to rotate at the same rotational speed as the lower casing half 194. The chamber 12 is rotated in the first direction at the first speed (as described above) such that particulate-matter in the liquid is collected against the collection wall.

Once the particulate matter in the liquid is collected, the filter unit is dewatered and the layer of particulate matter collected against the collection wall is dried or concentrated as described above.

The motor 34 is then operated to rotate the inlet conduit 174 in the second direction. Rotation of the inlet conduit 174 in the second direction rotates of the screw thread 176 in the second direction which drives the lower casing half 194 axially down the inlet conduit 174. This moves the lower casing half 194 from the closed position to the open position. The upper casing half 192 remains axially in position along the inlet conduit 174 due the axial slot 191 being retained into the groove 195 in the wall of the inlet conduit 174.

Once the lower 194 casing half is in the open position, further rotation of the chamber ejects the particulate matter radially outward from the annular particle dispense opening 200 between the upper 192 and the lower 194 casing components. Once the particulate matter has been has been ejected from the chamber, the motor 34 is operated to rotate the inlet conduit 174 in the first direction, thereby rotating the screw thread 176 in the first direction. Rotation of the screw thread in the first direction drives the lower casing half 194 axially up the inlet conduit 174. This moves the lower casing half 194 from the open position to the closed position, thereby closing the annular particle dispense opening 200. The chamber can then continue to rotate in the first direction and once more liquid is introduced can collect particulate matter against the collection wall.

Referring to FIGS. 16 and 17, the motor 34 is operated to rotate the inlet conduit 174 in the first direction when the scraping plate 170 is in the lower locking position and the upper 160 and lower 162 casing components are in the closed position. When the plate is in the lower locking position, the plate is locked (or bottoms out) to the lower casing component 162 such that rotation of the inlet conduit 174 in the first direction rotates the lower casing component 162 in the first direction. Friction between the upper 160 and lower casing components causes the upper casing component 160 to rotate at the same rotational speed as the lower casing component 162. The chamber is rotated at the first speed (as described above) such that particulate-matter in the liquid is collected against the collection wall.

Once the particulate matter in the liquid is collected, the filter unit is dewatered and the layer of particulate matter collected against the collection wall is dried or concentrated as described above.

The motor 34 is then operated to rotate the inlet conduit 174 in the second direction. Rotation of the inlet conduit 174 in the second direction rotates the screw thread 176 in the second direction which, (combined with the inertia of the chamber and the debris within) unlocks the scraping plate 170 from the lower locking position and drives the scraping plate 170 axially up the inlet conduit 174.

Continued rotation of the inlet conduit 174 in the second direction drives the scraping plate 170 from the lower locking position to the upper engaging position. As the scraping plate 170 moves axially along the inlet conduit 174, the scraping plate scrapes and collects the particulate matter on the collection wall.

Once the scraping plate 170 reaches the upper engaging position, continued rotation of the inlet conduit 174 in the second direction pushes the scraping plate 170 against the upper casing component 160 and moves the upper casing component 160 from the closed position to the open position. The scraping plate 170 applies sufficient upward force against the upper casing component 160 to overcome the bias of the spring 178 pushing the upper casing component towards the closed position. Once the upper casing component 160 is in the open position, further rotation of the chamber ejects the particulate matter radially outward from the annular particle dispense opening 182. Once the particulate matter has been ejected from the chamber, the motor 34 is operated to rotate in the inlet conduit 174, and thus the screw thread 176, in the first direction. Rotation of the screw thread in the first direction drives the scraping plate 170 axially down the inlet conduit 174 thereby moving the upper casing component 160 from the open position to the closed position and closing the annular particle dispense opening 182. The spring 178 biasing the upper casing component towards the closed position ensures the upper casing component moves from the open position to the closed position as the scraping plate 170 moves down the inlet conduit. Once the scraping plate is driven back down to the lower locking position, the scraping plate locks with the lower casing component. Continued rotation of the scraping plate in the first direction drives the lower casing component in the first direction. Friction between the upper 160 and lower casing components causes the upper casing component 160 to rotate at the same rotational speed as the lower casing component 162. The filter unit can thus continue to collect particulate matter against the collection wall.

As shown by FIG. 17, the particulate matter is ejected radially outward from the annular particle dispense opening 182 along a plane 184 that sits lower than the plane 180 of the ejected liquid. An outer housing (not shown) housing the chamber can thus collect the ejected particulate matter and the ejected filtered liquid in separate compartments or drains.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised.

While the disclosure includes exemplary embodiments described above, many equivalent modifications and variations will be apparent to those skilled in the art when given this disclosure. Accordingly, the exemplary embodiments set forth above are considered to be illustrative and not limiting. Various changes to the described embodiments may be made without departing from the scope of the claims.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural references unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A filter unit for separation of particulate matter from particulate-laden liquid, the filter unit comprising:
   a chamber defined by an upper axial end wall and an opposing lower axial end wall and a peripheral particle collection wall, the upper and lower axial end walls being spaced by the peripheral particle collection wall, the chamber being rotatable about an axis of rotation so as to impart rotational motion to the particulate-laden liquid;
   an inlet conduit extending within the chamber from or through the upper axial end walls towards the lower axial end wall, the inlet conduit comprising an opening proximal the lower axial end wall forming an inlet for delivering particulate-laden liquid into the chamber;
   an outlet provided in the upper axial end wall for discharging filtered liquid from the chamber; and
   a flow path from the inlet to the outlet,
wherein the flow path includes a radial component from the inlet to the peripheral particle collection wall and an axial component along the peripheral particle collection wall, and wherein the filter unit further comprises a guide plate connected to the lower axial end wall, an upper surface of the guide plate forming a guide surface extending radially from the inlet towards the peripheral collection wall.

2. The filter unit of claim 1 wherein the inlet conduit comprises an inlet flange proximal the opening forming the inlet.

3. The filter unit of claim 2 wherein the inlet flange has opposing axial faces and wherein the inlet flange comprises a vent extending between the opposing axial faces of the inlet flange.

4. The filter unit of claim 1 wherein the outlet comprises an annular opening circumscribing the inlet conduit.

5. The filter unit according to claim 1 further comprising at least one axially extending rib, the at least one axially extending rib extending radially from the peripheral wall.

6. The filter unit of claim 1 further comprising at least one baffle extending radially and circumferentially.

7. The filter unit of claim 1, wherein the lower axial end wall comprises a particle dispense opening for dispensing particulate matter from within the chamber and wherein the guide plate is mounted on a rotor or mount extending through the particle dispense opening.

8. The filter unit of claim 1, wherein the guide plate is connected to the lower axial end wall by ribs.

9. The filter unit of claim 7, wherein the guide plate is connected to the lower axial end wall by ribs.

10. The filter unit of claim 1, wherein the inlet conduit comprises an outlet flange extending radially from the inlet conduit proximal the outlet.

11. The filter unit of claim 1, wherein the upper axial end wall comprises at least one drain hole radially spaced from the axis of rotation.

* * * * *